US007692703B2

(12) United States Patent
Itoh et al.

(10) Patent No.: US 7,692,703 B2
(45) Date of Patent: Apr. 6, 2010

(54) IMAGE PICK-UP APPARATUS

(75) Inventors: Hiroshi Itoh, Hachioji (JP); Seisuke Matsuda, Hachioji (JP); Shigeru Hosokai, Hachioji (JP); Yuichi Gomi, Hachioji (JP); Yoshio Hagihara, Hachioji (JP)

(73) Assignee: Olympus Corporation, Tokyo (JP)

( * ) Notice: Subject to any disclaimer, the term of this patent is extended or adjusted under 35 U.S.C. 154(b) by 1637 days.

(21) Appl. No.: 10/830,961

(22) Filed: Apr. 23, 2004

(65) Prior Publication Data

US 2004/0212707 A1    Oct. 28, 2004

(30) Foreign Application Priority Data

Apr. 28, 2003    (JP)    ............................. 2003-124308

(51) Int. Cl.
*H04N 3/14* (2006.01)
*H04N 5/335* (2006.01)

(52) U.S. Cl. ..................................................... 348/302

(58) Field of Classification Search ................. 382/284; 348/275, 294, 302; 250/559.05, 559.06, 250/559.07, 559.08, 208.1; 257/258, 291, 257/292, 293, 294
See application file for complete search history.

(56) References Cited

U.S. PATENT DOCUMENTS

| 2001/0022858 | A1* | 9/2001 | Komiya et al. | 382/284 |
| 2001/0033701 | A1* | 10/2001 | Okisu et al. | 382/284 |
| 2002/0067416 | A1* | 6/2002 | Yoneda et al. | 348/302 |
| 2003/0234343 | A1* | 12/2003 | Cok et al. | 250/208.1 |
| 2005/0063608 | A1* | 3/2005 | Clarke et al. | 382/284 |
| 2008/0211942 | A1* | 9/2008 | Kosover et al. | 348/294 |

FOREIGN PATENT DOCUMENTS

| JP | 10-275906 | 10/1998 |
| JP | 2000209503 | 7/2000 |

* cited by examiner

*Primary Examiner*—Lin Ye
*Assistant Examiner*—Jason Whipkey
(74) *Attorney, Agent, or Firm*—Volpe and Koenig, P.C.

(57) ABSTRACT

An image pick-up apparatus includes an image pick-up device and a filter circuit. The image pick-up device includes a pixel portion for converting a subject image into an electric signal, a scanning circuit for dividing the pixel portion into a plurality of areas, for non-linearly dividing the boundary of the areas of at least one side of the adjacent areas based on the unit of pixel, and a plurality of output circuits for individually outputting video signals. The filter circuit performs filter processing of the video signals outputted from the plurality of output circuits for the pixels near the boundary of the areas. Thus, the image quality can be improved in the multi-channel output system.

5 Claims, 16 Drawing Sheets

| P1,1,1 | P1,2,1 | P1,3,1 | P1,4,1 | P1,5,1 | P1,6,1 | P1,7,1 | P1,8,2 | P1,9,2 | P1,10,2 | P1,11,2 | P1,12,2 |
| P2,1,1 | P2,2,1 | P2,3,1 | P2,4,1 | P2,5,1 | P2,6,2 | P2,7,2 | P2,8,2 | P2,9,2 | P2,10,2 | P2,11,2 | P2,12,2 |
| P3,1,1 | P3,2,1 | P3,3,1 | P3,4,1 | P3,5,1 | P3,6,1 | P3,7,1 | P3,8,2 | P3,9,2 | P3,10,2 | P3,11,2 | P3,12,2 |
| P4,1,1 | P4,2,1 | P4,3,1 | P4,4,1 | P4,5,1 | P4,6,2 | P4,7,2 | P4,8,2 | P4,9,2 | P4,10,2 | P4,11,2 | P4,12,2 |
| P5,1,1 | P5,2,1 | P5,3,1 | P5,4,1 | P5,5,1 | P5,6,1 | P5,7,1 | P5,8,2 | P5,9,2 | P5,10,2 | P5,11,2 | P5,12,2 |

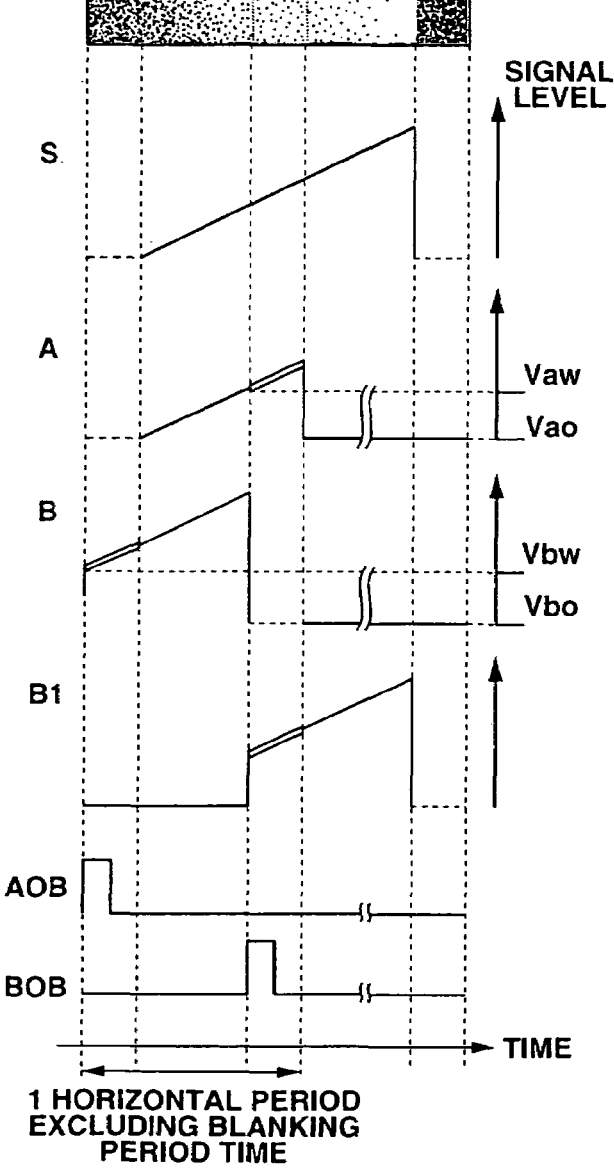

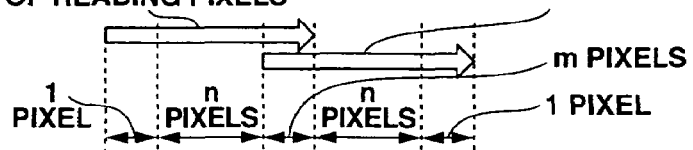
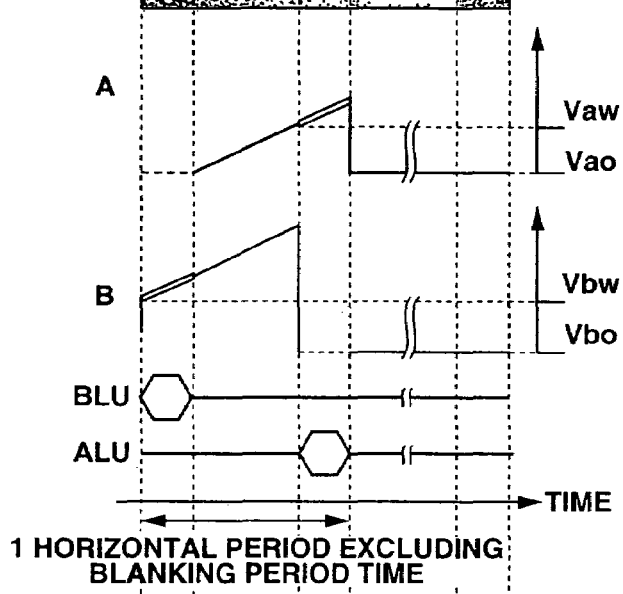
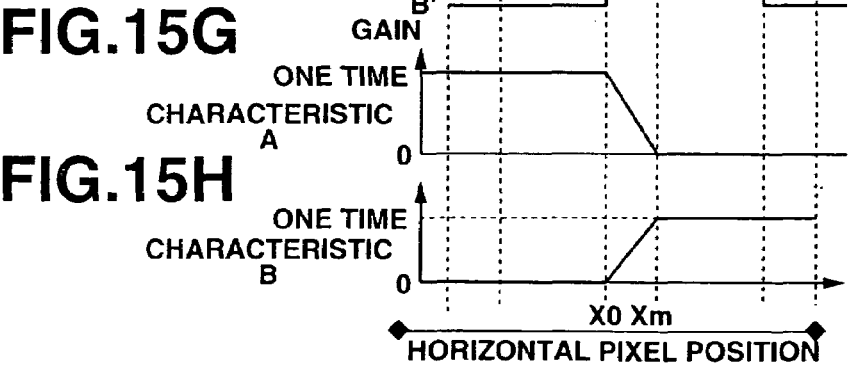
FIG.15A
FIG.15B
FIG.15C
FIG.15D
FIG.15E
FIG.15F
FIG.15I
FIG.15J
FIG.15G
FIG.15H

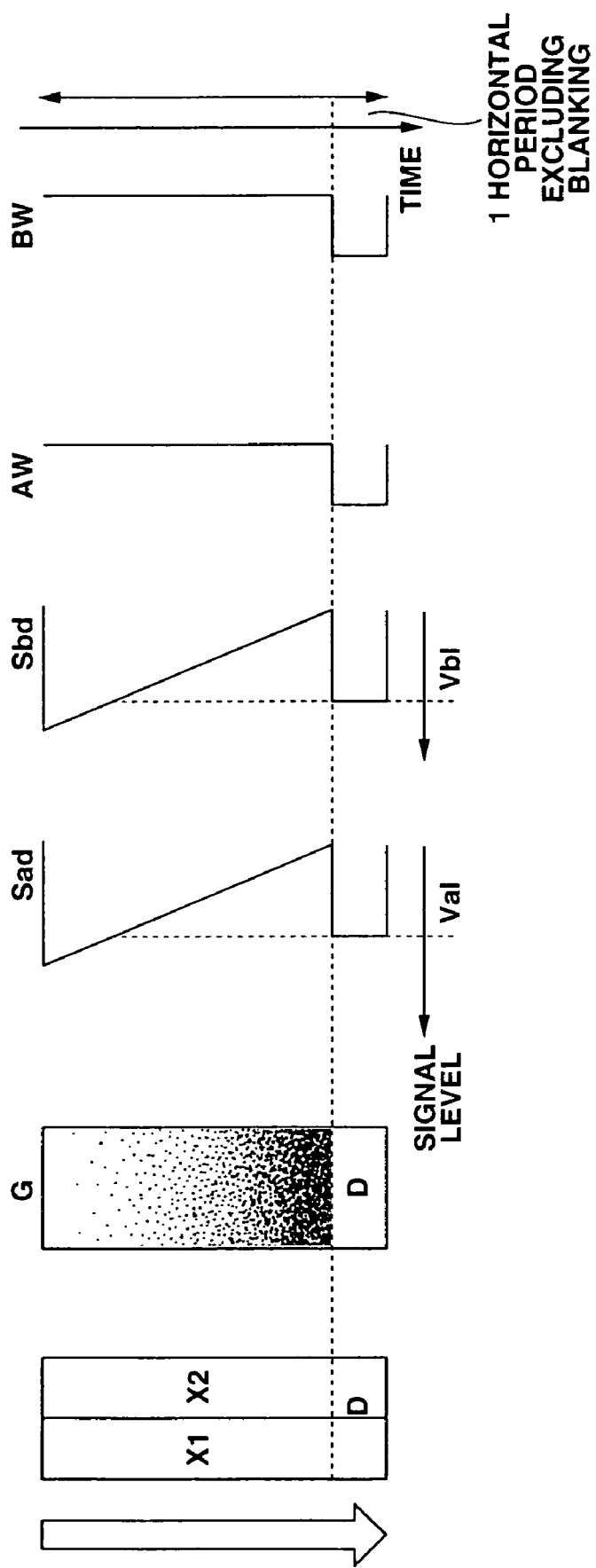

IMAGE PICK-UP APPARATUS

CROSS REFERENCE TO RELATED APPLICATION(S)

This application claims benefit of Japanese Application No. 2003-124308 filed in Japan on Apr. 28, 2003, the contents of which are incorporated by this reference.

BACKGROUND OF THE INVENTION

1. Field of the Invention

The present invention relates to an image pick-up apparatus using an image pick-up device of a multi-channel output system.

2. Description of the Related Art

An MOS solid-state image pick-up apparatus often uses a multi-channel output system (multi-line output system) for simultaneously obtaining a plurality of video signal outputs in parallel therewith from a single image pick-up device, as a general method for obtaining a video signal at a high frame rate from an image pick-up device having millions of pixels.

FIG. 1 is an explanatory diagram of a multi-channel output system of a general MOS solid-state pick-up device according to one related art. Referring to FIG. 1, the solid-state pick-up device has (n×n) pixels.

Matrix-arranged pixels $P_{11}$ to $P_{nn}$ are divided into four areas. A divided-area-1 has an area ranging from $P_{11}$ to $P_{aa}$, a divided-area-2 has an area ranging from $P_{1b}$ to $P_{an}$, a divided-area-3 has an area ranging from $P_{b1}$ to $P_{na}$, and a divided-area-4 has an area ranging from $P_{bb}$ to $P_{nn}$.

Signal outputs are obtained from the respective pixels arranged in the respective divided-area-1 to divided-area-4, that is, the signal outputs from the pixels $P_{11}$ to $P_{aa}$ in the divided-area-1 are obtained by a horizontal reading circuit (also referred to as a horizontal scanning circuit) 1 and a vertical scanning circuit 5. The signal outputs from the pixels $P_{1b}$ to $P_{an}$ in the divided-area-2 are obtained by a horizontal reading circuit 2 and the vertical scanning circuit 5. The signal outputs from the pixels $P_{b1}$ to $P_{na}$ in the divided-area-3 are obtained by a horizontal reading circuit 3 and a vertical scanning circuit 6. The signal outputs from the pixels $P_{bb}$ to $P_{nn}$ in the divided-area-4 are obtained by a horizontal reading circuit 4 and the vertical scanning circuit 6.

FIG. 2 shows an image pick-up apparatus for processing a plurality of video signal outputs as obtained above according to the one related art. The signals from the horizontal reading circuits 1 to 4 are respectively supplied to signal processing units 7 to 10. The signal processing units 7 to 10 have the same structure and comprise an amplifier and an A/D converter, respectively. In the respective signal processing units 7 to 10, the input signals are amplified by the amplifiers, the amplified signals are converted into digital signals by the A/D converters, and the digital signals are then supplied to an image memory 11. The image memory 11 stores and holds the signals from the signal processing units 7 to 10, and supplies the stored signals to a video signal processing unit (not shown) at the latter stage. The image memory 11 combines respective pixel signals in the divided-area-1 to divided-area-4, thus forming one image.

In the solid-state image pick-up device of the multi-line output system, the pixels at the boundary of the respective divided areas are included in both the adjacent divided areas and are overlappingly read. Then, the read pixels are averaged, to equalize the image quality at the boundary of the respective divided areas. One of the above-mentioned image pick-up devices is disclosed in Japanese Unexamined Patent Application Publication No. 2000-209503 (Patent Document 1).

FIG. 3 is an explanatory diagram showing the image pick-up device disclosed in the Patent Document 1. The image pick-up device shown in FIG. 3 is a general MOS solid-state pick-up device.

The pixel arrangement of the image pick-up device shown in FIG. 3 is the same as that shown in FIG. 1. In the image pick-up device shown in FIG. 1, the respective pixels are included in one of the divided areas. However, the divided areas do not include any common pixel. On the other hand, in the image pick-up device shown in FIG. 3, the adjacent divided areas include common pixels. That is, in the example shown in FIG. 3, the divided-area-1 comprises pixels $P_{11}$ to $P_{bb}$, the divided-area-2 comprises pixels $P_{1a}$ to $P_{bn}$, the divided-area-3 comprises pixels $P_{a1}$ to $P_{nb}$, and the divided-area-4 comprises pixels $P_{aa}$ to $P_{nn}$.

Horizontal reading circuits 15 to 18 read the respective pixels in the divided-area-1 to divided-area-4. For example, the signals of the pixels $P_{aa}$, $P_{ab}$, $P_{ba}$, and $P_{bb}$ are outputted from the entire horizontal reading circuits 15 to 18. The signals of the pixels $P_{a1}$ and $P_{b1}$ are outputted from the horizontal reading circuits 15 and 17. The signals from the overlappingly-read pixels are averaged, thus to equalize the image quality at the boundary of the divided areas.

SUMMARY OF THE INVENTION

According to the present invention, an image pick-up apparatus comprises an image pick-up device and a filter circuit. The image pick-up device comprises: a pixel portion for converting a subject image into an electric signal; a scanning circuit for dividing the pixel portion into a plurality of areas, for non-linearly dividing the boundary of the areas of at least one side of the adjacent areas based on the unit of pixel; and a plurality of output circuits for individually outputting video signals. The filter circuit performs filter processing of the video signals outputted from the plurality of output circuits for the pixels near the boundary of the areas.

The above and other objects, features and advantages of the invention will become more clearly understood from the following description referring to the accompanying drawings.

BRIEF DESCRIPTION OF THE DRAWING(S)

FIG. 8 is an explanatory diagram of one example of filter calculation according to the first embodiment of the present invention;

FIG. 9 is an explanatory diagram of another example of the filter calculation according to the first embodiment;

FIG. 10 is an explanatory diagram of another example of the filter calculation according to the first embodiment;

FIGS. 13A to 13H are waveform diagrams showing signal waveforms of respective units in a calculation processing unit according to the second embodiment of the present invention;

FIGS. 15A to 15H are waveform diagrams showing signal waveforms of respective units in the calculation processing unit according to the third embodiment;

FIGS. 20A to 20F are waveform diagrams showing signal waveforms of respective units in the calculation processing unit according to the fifth embodiment of the present invention;

DETAILED DESCRIPTION OF THE PREFERRED EMBODIMENTS

Figure 1:
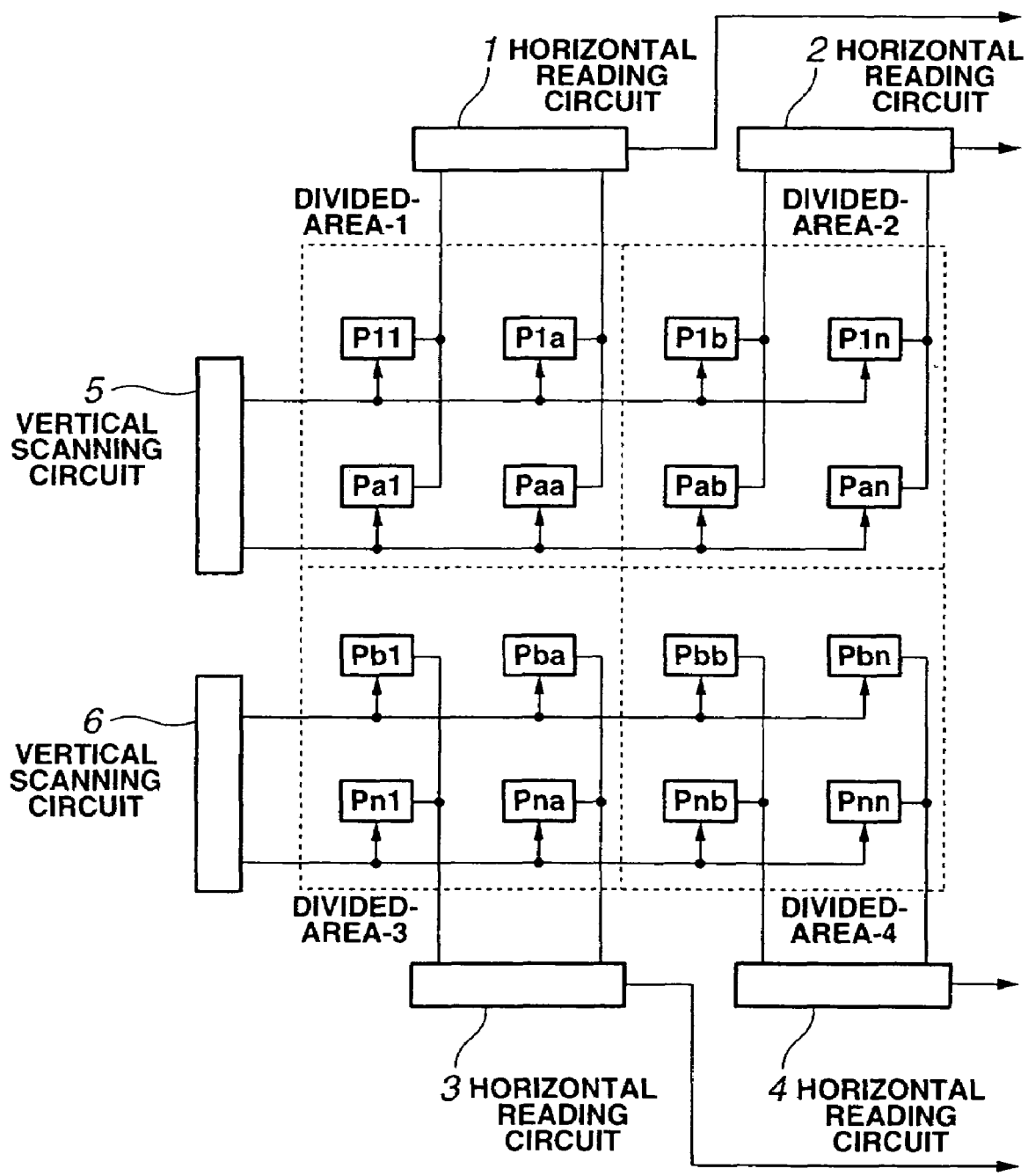
FIG. 1 is an explanatory diagram showing the structure of a general MOS solid-state pick-up device of a multi-channel output system according to one related art.
Figure 2:
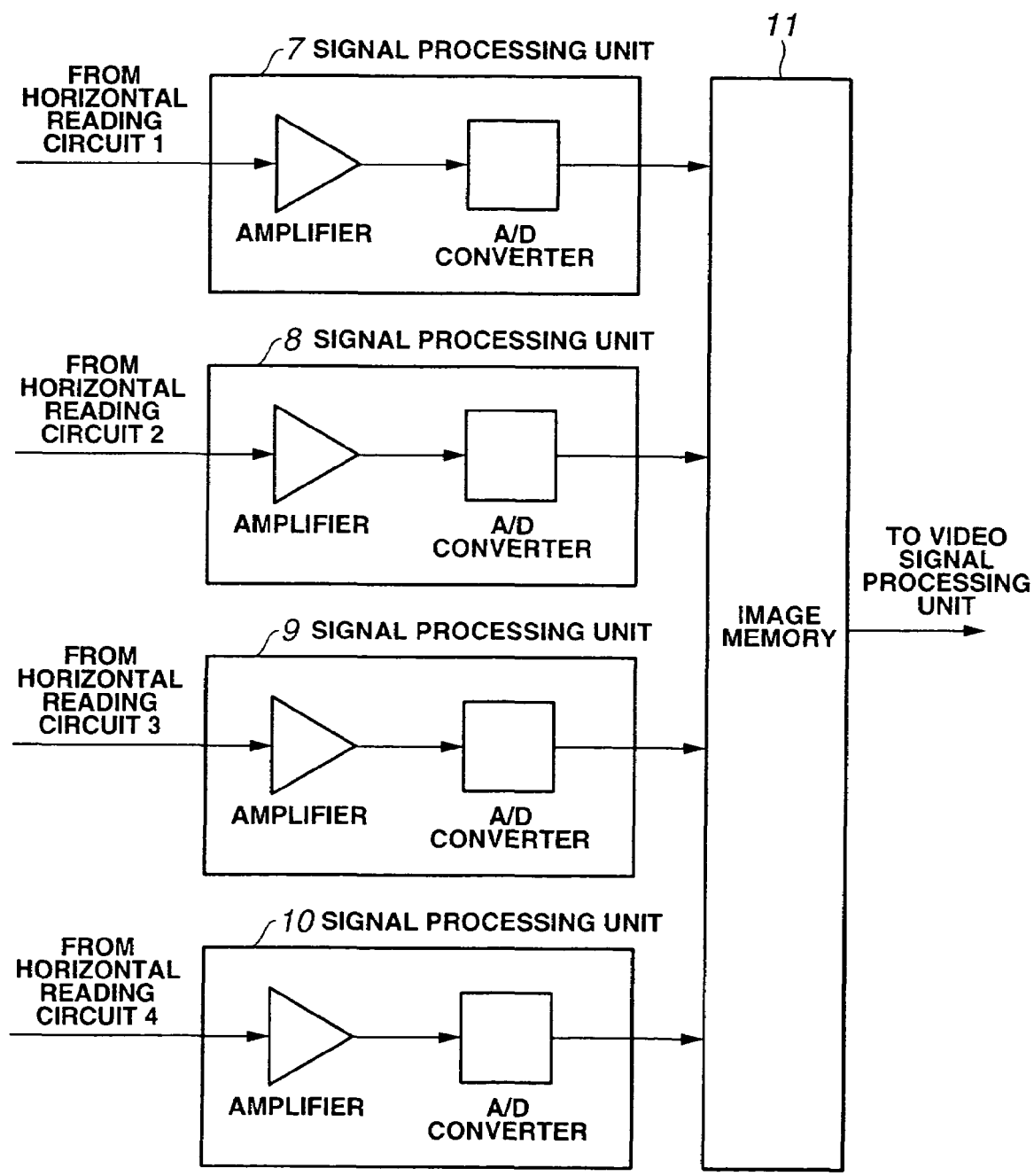
FIG. 2 is a circuit diagram showing an example of the structure of an image pick-up apparatus for processing a plurality of video signal outputs according to the one related art.
Figure 3:
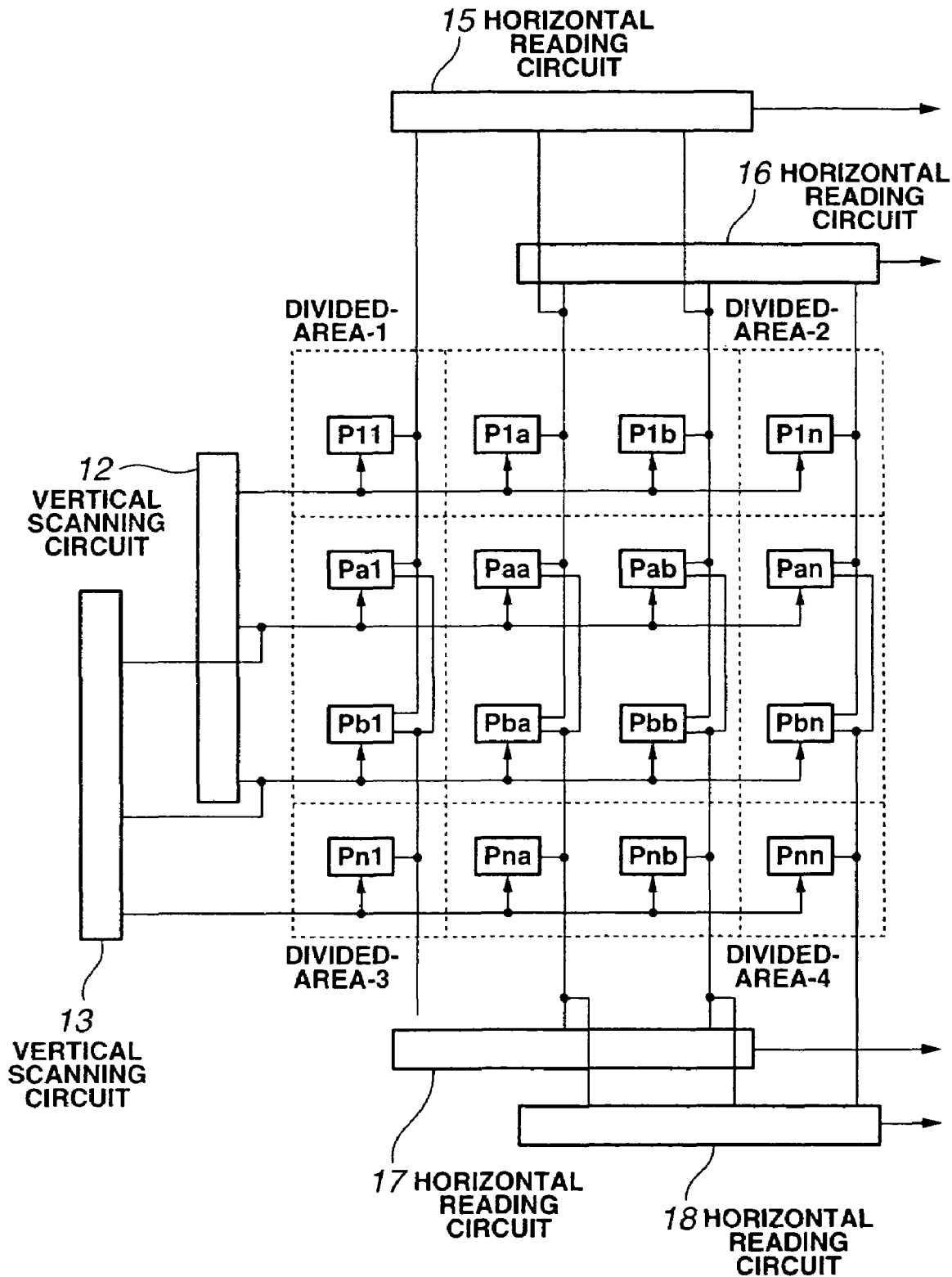
FIG. 3 is an explanatory diagram showing an image pick-up device according to another related art disclosed in Patent Document 1.
Figure 4:
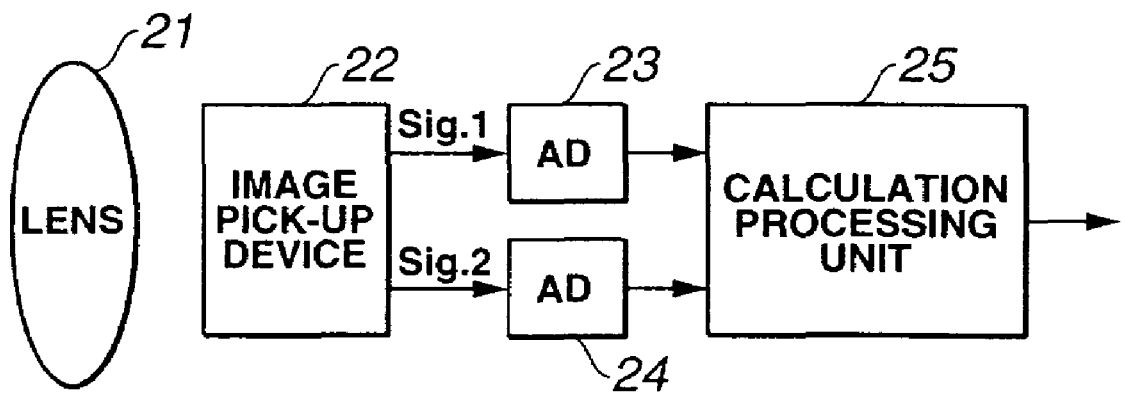
FIG. 4 is a block diagram showing a solid-state image pick-up device according to a first embodiment of the present invention.

Hereinbelow, the embodiments of the present invention will be described with reference to the drawings. FIG. 4 is a block diagram showing an image pick-up device according to the first embodiment of the present invention.

The image pick-up device shown in FIG. 4 uses an image pick-up device 22 of a multi-line output system. For the purpose of a brief description, as an example, an X-Y address type monochrome solid-state image pick-up device having two lines for outputting signals is applied as the image pick-up device 22.

The image pick-up device 22 has a lens 21 in front thereof. The lens 21 guides light from a subject (subject light) to an image pick-up surface of the image pick-up device 22. The image pick-up device 22 photoelectrically converts incident light from the lens 21 and outputs a video signal in accordance with an optical image of the subject.

Figure 5:
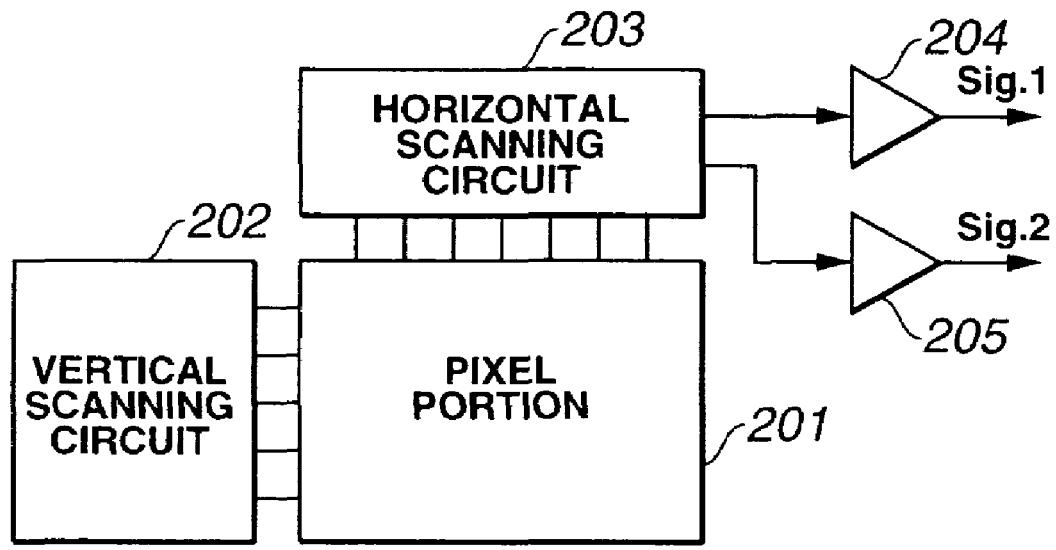
FIG. 5 is an explanatory diagram showing the specific structure of an image pick-up device 22 shown in FIG. 4 according to the first embodiment.

FIG. 5 is an explanatory diagram showing the specific structure of the image pick-up device 22 shown in FIG. 4.

The image pick-up device 22 comprises: a pixel portion 201; a vertical scanning circuit 202; a horizontal scanning circuit 203; and output circuits 204 and 205.

The pixel portion 201 comprises pixels (not shown) matrix-arranged. The each pixel comprises a photoelectrically converting element and a switch. The photoelectric converting element stores signals corresponding to the incident light. The signals stored in the photoelectric converting element are outputted via the switch in the pixel.

The pixel portion 201 is divided into a plurality of divided areas. The pixel signals stored in the pixel are read every divided area. According to the first embodiment, the pixel portion 201 is divided into divided-area-1 and divided-area-2 and the divided-area-1 and divided-area-2 have a zigzag area in the horizontal direction.

Figure 6:
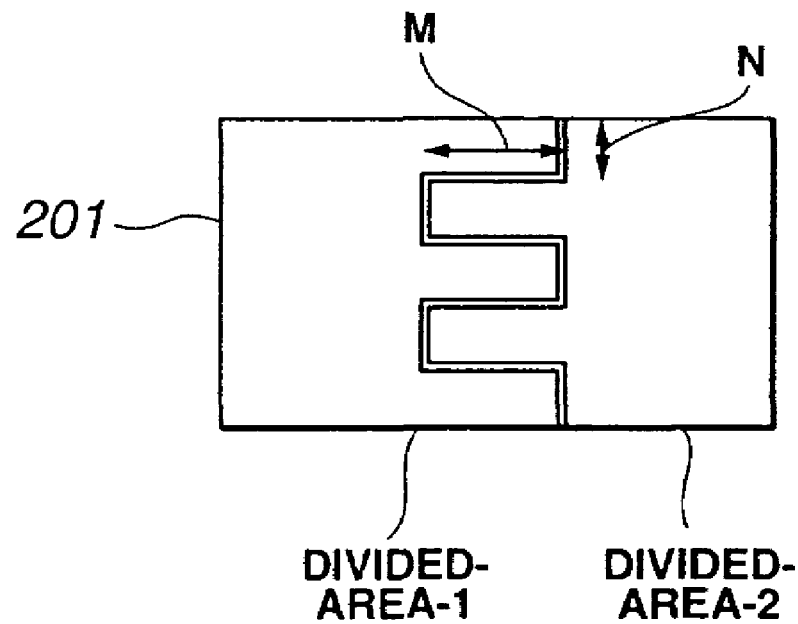
FIG. 6 is an explanatory diagram showing a method for dividing a pixel portion 201 shown in FIG. 5 according to the first embodiment.

FIG. 6 is an explanatory diagram showing a method for dividing the pixel portion 201 shown in FIG. 5 according to the first embodiment.

Referring to FIG. 6, at the boundary of the divided-area-1 and divided-area-2 in the pixel portion 201, the area thereof is divided such that projected portions are formed, with N pixels in the vertical direction and M pixels in the horizontal direction, alternately in the divided-area-1 and divided-area-2. That is, the boundary of the divided-area-1 and divided-area-2 is zigzag-shaped. In the M pixels of the boundary in the horizontal direction, the M pixels that belong to divided-area-1 or divided-area-2 of the projected portions are alternately switched every N pixels in the vertical direction.

The pixel portion 201 has vertical signal lines and row selecting lines (not shown) corresponding to the number of pixels in the horizontal and vertical direction. The pixels on the same row are connected to a common row selecting line and the pixels on the same column are connected to a common vertical signal line. The row selecting line on the row is connected to the vertical scanning circuit 202 and the vertical scanning circuit 202 sequentially selects the row selecting line on the row by a row selecting signal and also selects the row selecting lines for the entire rows in one vertical scanning period. The vertical signal line on the column is connected to the horizontal scanning circuit 203 and the horizontal scanning circuit 203 sequentially selects the vertical signal line on the column in one horizontal scanning period.

The vertical scanning circuit 202 selects the row selecting line on each row, thereby enabling of the reading of the pixel signal from all the pixels on the same selected row. The horizontal scanning circuit 203 sequentially reads and outputs the pixel signal in the column order of pixels on the selected one row.

The horizontal scanning circuit 203 has, for example, two-system horizontal sub-scanning circuits. The two-system horizontal sub-scanning circuits simultaneously read the pixel signals of the pixels in the divided-area-1 and divided-area-2. The pixel signals from the two systems read from the pixels in the divided-area-1 and divided-area-2 are outputted as video signals Sig1 and Sig2 via output circuits 204 and 205.

Referring to FIG. 4, the two-system video signals Sig1 and Sig2 from the image pick-up device 22 are supplied to the A/D converters 23 and 24. The A/D converters 23 and 24 convert the inputted video signals Sig1 and Sig2 into digital signals and output the digital signals to a calculation processing unit 25. The calculation processing unit 25 performs the electric filter processing of the inputted video digital signals Sig1 and Sig2.

When the outputs of the video signals Sig1 and Sig2 from the image pick-up device 22 are digitized, the A/D converters 23 and 24 are not necessary. In this case, filter processing can digitally be performed by using a delay element or the like.

Figure 7:
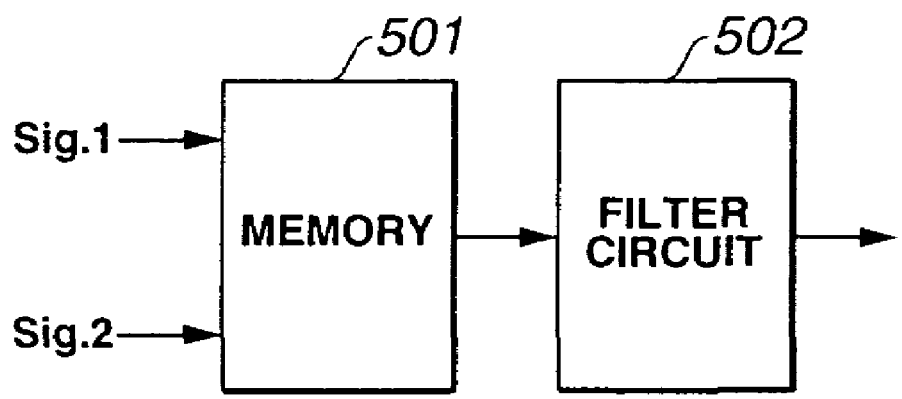
FIG. 7 is a block diagram showing the specific structure of a calculation processing unit 25 shown in FIG. 4 according to the first embodiment.

FIG. 7 is a block diagram showing the specific structure of the calculation processing unit 25 shown in FIG. 4 according to the first embodiment. The calculation processing unit 25 comprises: a memory 501 and a filter circuit 502.

The video signals Sig1 and Sig2 from the A/D converters 23 and 24 are supplied to the memory 501. The video signals Sig1 and Sig2 respectively corresponding to the divided-area-1 and divided-area-2 are stored in the memory 501, are sequentially rearranged in order in accordance with the position on the screen, and are combined to one image on the screen. The memory 501 outputs the video signal of the combined image to the filter circuit 502. The filter circuit 502 subjects the inputted video signal to predetermined filter processing, and outputs the signal to a circuit at the latter stage (not shown).

In the image pick-up device according to the first embodiment, the divided-area-1 and divided-area-2 use the zigzag division for switching the dividing position in the horizontal direction for every predetermined number of pixels in the vertical direction. The filter circuit 502 performs the filter processing of the video signal obtained by combining the video signals corresponding to the divided-area-1 and divided-area-2 which are zigzag-divided. The zigzag division improves the processing capacity of the filter processing. The video signals from the memory 501 are obtained sufficiently suppressing the influence on variation in characteristics on every output line of the two systems in the image pick-up device 22. Thus, it is possible to obtain an equalized and uniform image as the whole image with the suppressed characteristic difference depending on the divided areas.

Figures 8, 9, 10:
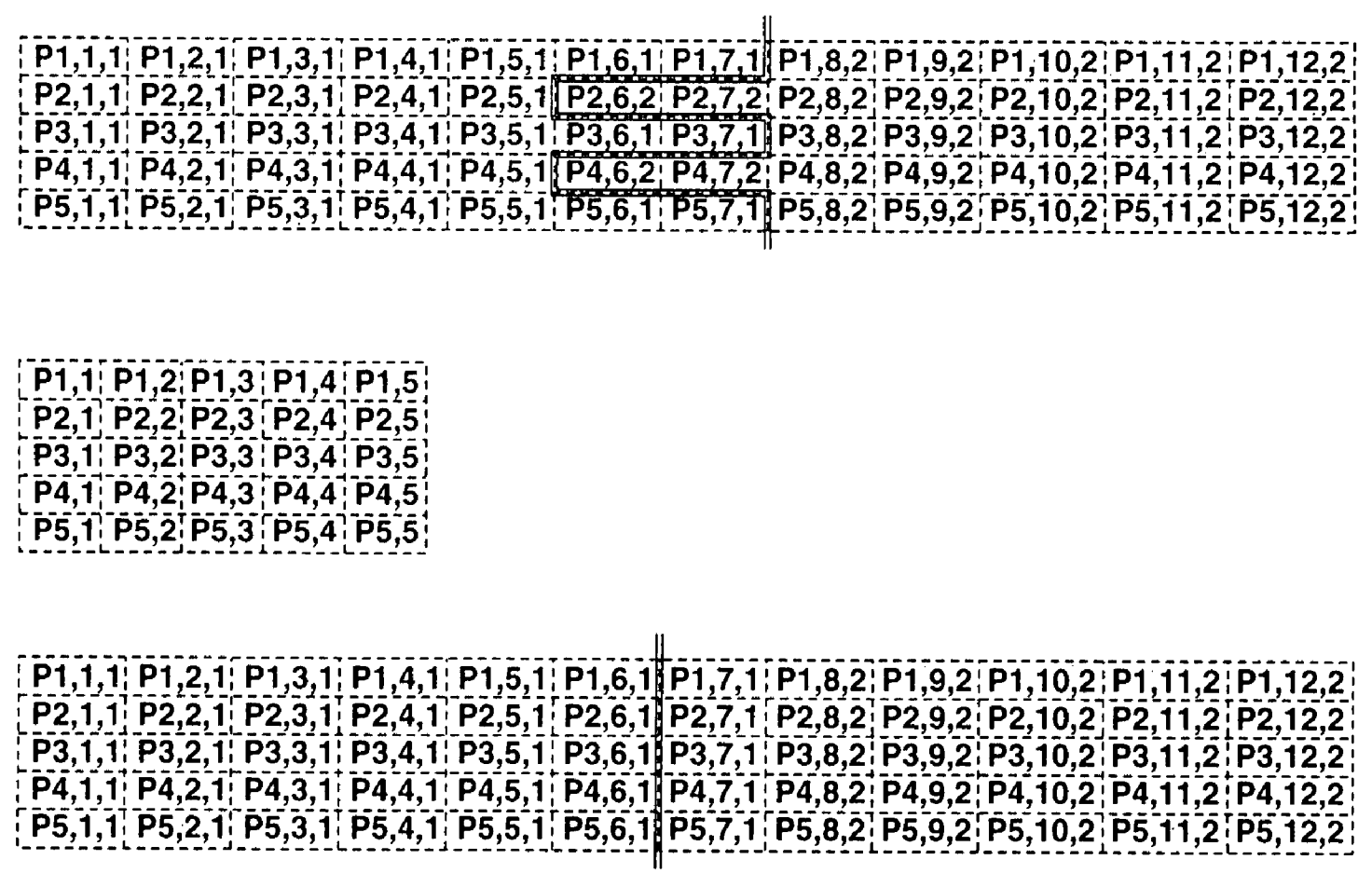
Figure 11:
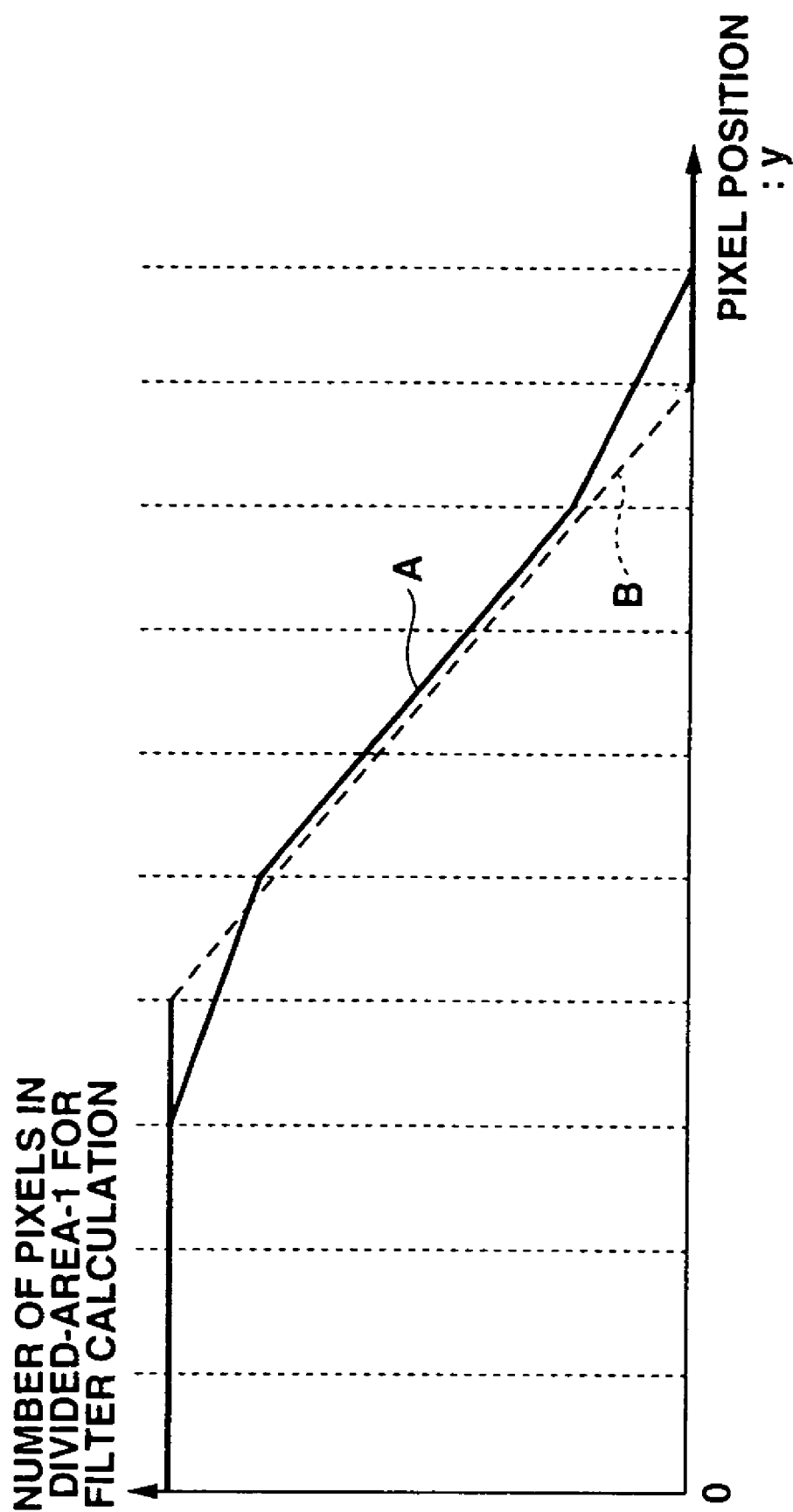
FIG. 11 is a graph showing characteristics of the filter calculation, with the axis of abscissas corresponding to the pixel position based on the unit pixel and the axis of ordinate corresponding to the number of pixels according to the first embodiment.

Next, a description is given of the operation with the above-described structure with reference to FIGS. 8 to 11. FIGS. 8 to 10 are explanatory diagrams of filter calculation. FIG. 11 is a graph showing characteristics of the filter calculation, with the axis of abscissas corresponding to the pixel position based on the pixel unit and the axis of ordinate corresponding to the number of pixels according to the first embodiment.

The subject image is formed on the image pick-up surface of the image pick-up device 22 via the lens 21. The image pick-up device 22 divides the pixel portion 201 into two areas in, for example, the horizontal direction, and outputs the video signals Sig1 and Sig2 based on the picked-up image from the two-system output lines in every divided area. The video signals Sig1 and Sig2 are respectively converted into digital signals by the A/D converters 23 and 24 and then are supplied to the calculation processing unit 25. The calculation processing unit 25 stores the inputted video signals Sig1 and Sig2 into the memory 501, returns the stored signals to the original video signal on one screen under the control of writing and reading addresses, and supplies the signal to the filter circuit 502. The filter circuit 502 suppresses the characteristic difference depending on the divided area by the filter processing of the inputted video signal and obtains the equalized and uniform image.

Next, the specific filter processing will be described.

FIG. 8 shows divided areas in the pixel portion 201. Respective segments in FIG. 8 show the pixels in the pixel portion 201, and reference symbol $P_{x,y,z}$ in the segment denotes the pixel on the x-th row and the y-th column, which belongs to a divided area z (where x, y, and z are integers). A double line (broken thick line) shown in FIG. 8 indicates the boundary between the divided-area-1 and divided-area-2. Referring to FIG. 8, in the divided-area-1 and divided-area-2, the boundary of the divided-area-1 and divided-area-2 is alternately deviated in the horizontal direction by two pixels and is zigzag-shaped. That is, referring to FIG. 6, the number N of vertical pixels is 1 and the number M of horizontal pixels is 2.

FIG. 9 is an explanatory diagram of another example of the filter calculation of the filter circuit 502 according to the first embodiment. Referring to FIG. 9, a describing method corresponding to that shown in FIG. 8 is used and the indication of the divided areas is omitted.

The filter circuit 502 performs the filter calculation based on the unit of pixel. It is assumed that a target pixel as the target of the filter calculation is a pixel $P_{3,3}$ in the center of FIG. 9. The filter circuit 502 performs the filter processing of the target pixel by using the pixel signal of the pixel in an arbitrary pixel range (hereinafter, referred to as a calculation range) including the target pixel. For the purpose of a brief description, it is assumed that the filter calculation of the filter circuit 502 uses the pixel range of (5×5) pixels including five pixels in the respective vertical and horizontal directions with the target pixel as the center pixel.

The signal level of the pixel $P_{x,y,z}$ is assumed to be $L_{x,y,z}$. The filter circuit 502 executes the filter calculation of the following Formula (1) for the target pixel P3,3, for example, thus to obtain a calculation result $P_{f3,3}$.

$$P_{f3,3} = k_{11} \times L_{1,1} + k_{12} \times L_{1,2} + k_{13} \times L_{1,3} + k_{14} \times L_{1,4} + k_{15} \times L_{1,5} + \quad (1)$$
$$k_{21} \times L_{2,1} + k_{22} \times L_{2,2} + k_{23} \times L_{2,3} + k_{24} \times L_{2,4} + k_{25} \times L_{2,5} +$$
$$k_{31} \times L_{3,1} + k_{32} \times L_{3,2} + k_{33} \times L_{3,3} + k_{44} \times L_{4,4} + k_{45} \times L_{4,5} +$$
$$k_{51} \times L_{5,1} + k_{52} \times L_{5,2} + k_{53} \times L_{5,3} + k_{54} \times L_{5,4} + k_{55} \times L_{5,5}$$

Incidentally, symbols $k_{11}$ to $k_{55}$ denote predetermined coefficients.

For the purpose of a brief description, all the coefficients $k_{11}$ to $k_{55}$ are assumed to be equal to 1 and then the filter calculation of the filter circuit 502 is the total of signal levels of all the pixels in the calculation range of (5×5) pixels with the target pixel as the center.

When the calculation range of the filter calculation exists in both of the two divided areas, the calculation result is influenced by the signal level of the pixel common to the divided areas. In order to check the influence degree, the filter calculation using the Formula (1) is applied to the pixels shown in FIG. 8. For example, the filter calculation is applied to the pixels $P_{3,3,1}$ to $P_{3,10,2}$ on the third row shown in FIG. 8, thus to calculate the $P_{f,3,1}$ to $P_{f3,10,2}$ constituting the result of processing of the filter calculation.

For example, the calculation result $P_{f3,3,1}$ is obtained by the following Formula (2).

$$P_{f3,3,1} = L_{1,1,1} + L_{1,2,1} + L_{1,3,1} + L_{1,4,1} + L_{1,5,1} + L_{2,1,1} + L_{2,2,1} +$$
$$L_{2,3,1} + L_{2,4,1} + L_{2,5,1} + L_{3,1,1} + L_{3,2,1} + L_{3,3,1} + L_{3,4,1} +$$
$$L_{3,5,1} + L_{4,1,1} + L_{4,2,1} + L_{4,3,1} + L_{4,4,1} + L_{4,5,1} + L_{5,1,1} +$$
$$L_{5,2,1} + L_{5,3,1} + L_{5,4,1} + L_{5,5,1}$$
(2)

Herein, the value z of the signal level $L_{x,y,z}$ is considered. As will be obvious, the calculation range includes only the pixels in the divided-area-1 and therefore all the calculation results $P_{f3,3,1}$ relate to only the signal levels of the pixels in the divided-area-1. Similarly, values of $P_{f3,4,1}$ to $P_{f3,10,2}$ are calculated. Every time when the horizontal pixel position y of the target pixel is incremented by 1 between the values 3 to 10 thereof, the number of pixels in the divided-area-1 which influences on the calculation result decreases to 25, 23, 21, 16, 11, 6, 3, and 0.

On the other hand, when the boundary of the divided-area-1 and divided-area-2 is a straight line, the result of the filter calculation is obtained. FIG. 10 shows the pixels in the divided area according to the describing method corresponding to that shown in FIG. 8. Referring to FIG. 10, in the case of forming the divided-area-1 and divided-area-2 by dividing the pixel portion so that the boundary line is a straight line, every time the horizontal pixel position y of the target pixel is incremented by 1 between the values 3 to 10 thereof, the number of pixels in the divided-area-1 which influences on the calculation result decreases to 25, 25, 20, 15, 10, 5, 0, and 0.

FIG. 11 schematically shows the above result. The axis of the abscissa indicates the horizontal pixel position y of the target pixel and the axis of ordinate indicates the number of pixels of the divided-area-1 contributed to the filter calculation result of the target pixel. A characteristic A (solid line) shows the case of the zigzag division shown in FIG. 8 and a characteristic B (broken line) shows the case of the straight-line division.

Referring to FIG. 11, the change of the characteristic A is relatively smooth. On the contrary, the change of the characteristic B is relatively sharp. That is, it is possible to smooth the change of the image quality near the boundary of the divided areas due to the characteristic difference on the two-system output lines corresponding to the respective divided areas, by combining use of the zigzag division with filter processing.

As mentioned above, according to the first embodiment, upon outputting the video signal as the multi-line output from the divided area in which the image pick-up device has the non-linear boundary, the boundary area of the output in the image pick-up device is subjected to the electric filter processing. At the boundary of the divided areas, the number of pixels in the divided area for the filter calculation smoothly changes from one divided area to another divided area. Consequently, it is possible to suppress the characteristic variation in the divided areas which is most remarkable at the boundary of the divided area and to exceedingly decrease the visual influence on the video image.

According to the first embodiment, the A/D converter is constructed as an external device of the image pick-up device. However, according to the following embodiments, the image pick-up device may internally include an arbitrary circuit including the A/D converter.

The filter coefficient $k_{x,y,z}$ is not 1 and is optimized in accordance with the zigzag shape, thereby further improving the image quality.

The characteristic variation in every divided area (in every output line) includes the characteristic variations of all the circuit systems, such as the variation upon reading the pixels from the divided areas, the variation during transferring the pixel signal, the variation of various signal processing, and the variation of the variation correction processing. For example, the variation in every output line includes the variation on characteristics of the external device of the image pick-up device, such as the A/D converters 23 and 24.

Figure 12:
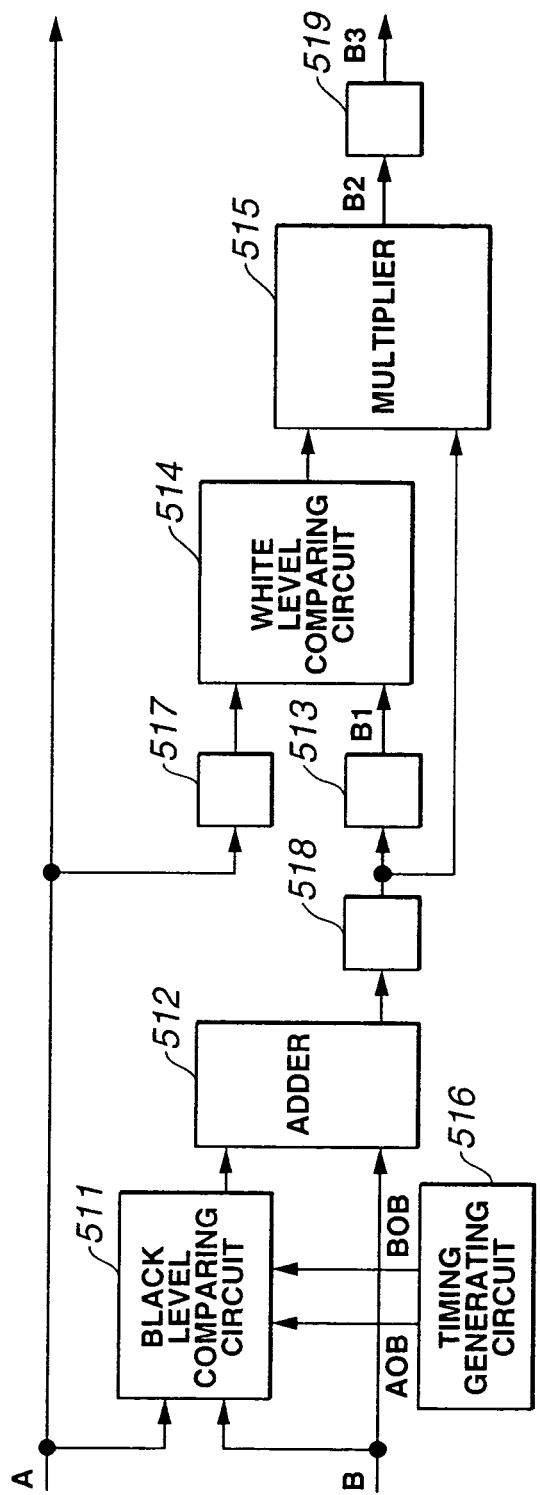
FIG. 12 is a block diagram showing a calculation processing unit according to a second embodiment of the present invention.

FIGS. 12 and 13A to 13H relate to the second embodiment of the present invention. FIG. 12 is a block diagram showing a calculation processing unit according to the second embodiment. FIGS. 13A to 13H are waveform diagrams showing signal waveforms of units.

The entire structure according to the second embodiment is similar to that shown in FIG. 4 and the structure of the calculation processing unit according to the second embodiment is different from that shown in FIG. 4. The internal structure of the image pick-up device is similar to that according to the first embodiment. However, the pixel portion is set to two divided areas which is obtained by dividing the pixel portion into two areas in the horizontal direction according to the second embodiment. The divided-area-1 and divided-area-2 have a straight linear boundary. A predetermined column at the boundary is a pixel which overlappingly belongs to both the divided-area-1 and divided-area-2 (hereinafter, referred to an overlapped pixel). The number of divisions and the dividing direction can freely be set.

The vertical scanning circuit 202 and the horizontal scanning circuit 203 simultaneously read the pixels from the divided-area-1 and divided-area-2. That is, in either of the divided-area-1 and divided-area-2, the pixel signals are sequentially read every column, starting from the head row. The divided-area-1 and divided-area-2 have the characteristic variations. The characteristic variation is constituted mainly, of the offset (difference in black level), gain (difference in white level when the black levels match), and the difference in linearity.

According to the second embodiment, the characteristic variations are detected and then are corrected. Then, the video signal is obtained.

The video signals Sig1 and Sig2 corresponding to the divided-area-1 and divided-area-2 are supplied to the calculation processing unit shown in FIG. 12 as signals A and B respectively. The signals A and B are inputted to a black level comparing circuit 511. The pixel portion 201 has an optical black pixel (OB pixel) as the reference of the black level which is shielded. A timing generating circuit 516 generates a timing signal of OB pixels of the signals A and B, and outputs the timing signal to the black level comparing circuit 511. The black level comparing circuit 511 compares the levels of the signals A and B inputted at the input timing of the OB pixels of the signals A and B, obtains the difference between the black level of the signal B and that of the signal A as the reference. Then, the resultant difference is outputted to an adder 512.

The adder 512 also receives the signal B. The adder 512 adds the output from the black level comparing circuit 511 to the signal B, thereby matching the black level of the signal B with that of the signal A and outputting the matching signal to a black level subtracting circuit 518. On the other hand, the signal A is inputted to a black level subtracting circuit 517.

The black level subtracting circuit 517 subtracts the black level from the inputted signal A. The black level subtracting circuit 518 subtracts the black level from the output of the adder 512. Thus, the black level is subtracted from the signals A and B, thereby enabling the comparison of the white levels thereof. The output from the black level subtracting circuit 518 is supplied to a delay device 513. The delay device 513 delays the signal B by the time corresponding to the difference between the reading times of the signals A and B, and the time axis of the signal A matches that of the signal B.

The signal A from the black level subtracting circuit 517 and the signal B from the delay device 513 are supplied to a white level comparing circuit 514. The white level comparing circuit 514 obtains the ratio of the two inputs. As mentioned above, the divided-area-1 and divided-area-2 include the common pixel and the pixel signal of the overlapped pixel is originally at the same level. The white level comparing circuit 514 compares the portion of the overlapped pixel of the signal A with the portion of the overlapped pixel of the signal B, thereby obtaining the ratio of the levels due to the characteristic variation.

The output from the white level comparing circuit 514 is supplied to a multiplier 515. The multiplier 515 multiplies the output of the white level comparing circuit 514 to the signal B from which the black level is removed. Thus, the signal B is corrected in accordance with the white level of the signal A. The white levels of the signals A and B match. The output from the multiplier 515 is supplied to a black level reproducing circuit 519. The black level reproducing circuit 519 reproduces the black level of the inputted signal B, and outputs the reproduced signal as a signal B3.

Next, the operation with the above structure will be described with reference to FIGS. 13A to 13H.

FIG. 13A shows the respective areas in the pixel portion 201. That is, reference symbols X1 and X2 respectively denote independent reading areas including n pixels, which are individually read from the divided-area-1 and divided-area-2. Reference symbol Y denotes an overlappingly-read area including m pixels which can overlappingly be read in the horizontal direction in the divided-area-1 and divided-area-2. Reference symbols Z1 and Z2 denote one pixel which is individually read in the divided-area-1 and divided-area-2, and also denote areas including the optical black pixels (OB pixels) as the reference of the black level which is shielded (l, m, and n are integers).

The vertical scanning circuit 202 sequentially scans the pixels from the line on the upper side of the pixel portion 201 to the lower side and the horizontal scanning circuit 203 sequentially scans the pixels starting from the those on the left side to the right. Referring to FIG. 13B, an image of the subject with the brightness which smoothly changes from the left to the right in the horizontal direction is picked up. When the pixels are scanned for one arbitrary horizontal period without the area division and the video signal is obtained by the single-line output, an output shown by a signal s is obtained as shown in FIG. 13C.

On the contrary, when the pixel portion 201 is divided into the divided-area-1 and divided-area-2 and the video signals in the divided-area-1 and divided-area-2 are outputted by reading via the two output lines, the output signals of the video signals Sig1 and Sig2 are obtained for one arbitrary horizontal period as shown by symbols A and B shown in FIGS. 13D and 13E. The axis of the abscissa indicates the time corresponding to the pixel position and the axis of ordinate indicates the signal level.

The signals A and B are respectively converted into digital signals by the A/D converters. Then, the digital signals are transmitted to the calculation processing unit shown in FIG. 12. The black level comparing circuit 511 in the calculation processing unit compares the black level of the signal A with that of the signal B. That is, pulses AOB and BOB shown in FIGS. 13G and 13H are supplied to the black level comparing circuit 511 from the timing generating circuit 516. The black level comparing circuit 511 holds for one horizontal scanning period samples of the OB portion in each signal output, thereby enabling the comparison of the black reference levels of the signals which are inputted at the different timings. A black-level difference ($V_{ao}-V_{bo}$) calculated by the black level comparing circuit 511 is added to the signal B by the adder 512, and the signal B with the matching black level in both signals is generated.

Next, the black level is subtracted by ($V_{ao}$) by the black level subtracting circuit 518 in the signal B from the adder 512. Further, the signal B is delayed by (1+n) pixels by the delay device 513, thus to obtain a signal B1 shown in FIG. 13F. The signal B1 is supplied to the white level comparing circuit 514.

Similar to the signal B, the black level is subtracted by ($V_{ao}$) from the signal A inputted to the calculation processing unit by the black level subtracting circuit 517, and the resultant signal is supplied to the white level comparing circuit 514. The timings of the signals A and B1 inputted to the white level comparing circuit 514 in the overlapped pixel area are inputted as signals which completely match based on the pixel unit of the signal.

The white level comparing circuit 514 compares the levels of the overlappingly-read pixels in the signals with the matched timing, thus to obtain $(V_{aw}-V_{ao})/(V_{bw}-V_{ao})$. The comparison result of the white level comparing circuit 514 indicates the ratio of amplitudes of the overlapped pixels of the signals A and B1 which are originally at the same level. The output of the white level comparing circuit 514 is supplied to the multiplier 515 and the amplitude of the signal B1 is corrected. That is, the output of the multiplier 515 is B1× $(V_{aw}-V_{ao})/(V_{bw}-V_{ao})$. Thus, the white levels of the signals A and B1 match.

Finally, the black level reproducing circuit 519 reproduces the black level of a signal B2 whose white level is corrected and outputs the reproduced signal as a signal B3. Consequently, the black level and white level of the signals A and B3 are corrected, and the characteristic variation of output lines is corrected based on one output line as the reference.

According to the second embodiment, the signal level of the same subject from the same pixel is read for every different area in the overlapped pixel area. The signal levels are matched, thereby correcting the characteristic variation in output lines. The above processing can be performed for an arbitrary pixel in real-time. Therefore, it is possible to correspond to the characteristic change due to the temperature fluctuation or the like of the image pick-up device.

According to the second embodiment, modifications are variously considered. For example, the multiplier may comprise a look-up table (LUT) using a memory. Alternatively, the positions of the black level may be matched by the delay device and the difference may be calculated.

The black levels are integrated and are averaged for a predetermined period, random noises of the corresponding portion are reduced, and the resultant levels are compared and are corrected, thereby correcting the characteristic variation to get the high quality image.

Figure 14:
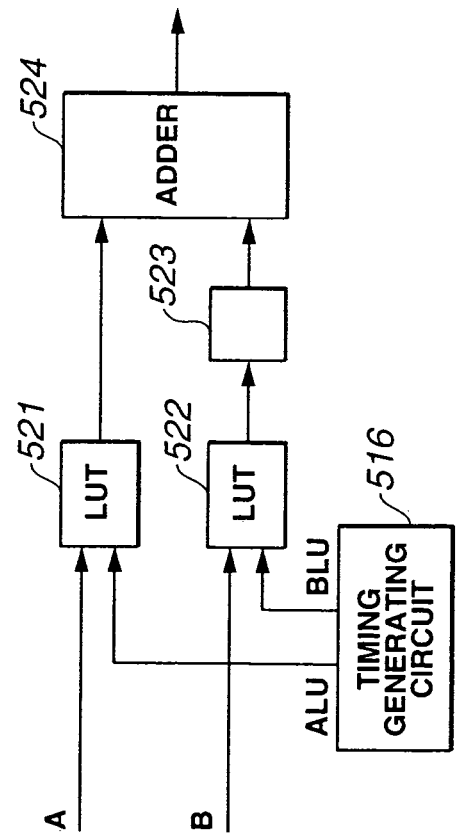
FIG. 14 is a block diagram showing a calculation processing unit according to a third embodiment of the present invention.

FIGS. 14 and 15A to 15H relate to the third embodiment. FIG. 14 is a block diagram showing a calculation processing unit according to the third embodiment. FIGS. 15A to 15H are waveform diagrams showing signal waveforms of respective units.

The entire structure according to the third embodiment is the same as that shown in FIG. 4. However, according to the third embodiment, the structure of the calculation processing unit is different from that shown in FIG. 4. The inner structure of the image pick-up device is similar to that according to the first embodiment. Similar to the second embodiment, the pixel portion is set to two divided areas in the horizontal direction. The boundary of the divided-area-1 and divided-area-2 is straight and a predetermined column at the boundary is the overlapped pixels of the divided-area-1 and divided-area-2. The number of divisions and the dividing direction are freely set.

The vertical scanning circuit 202 and the horizontal scanning circuit 203 simultaneously read the pixels from the divided-area-1 and divided-area-2. That is, in either of the divided-area-1 and divided-area-2, the pixel signals are read every column, starting from the head row.

The video signals Sig1 and Sig2 corresponding to the divided-area-1 and divided-area-2 are supplied to the calculation processing unit shown in FIG. 14 as the signals A and B. The signals A and B are respectively inputted to look-up tables (LUTs) 521 and 522 comprising a memory and the like. The timing generating circuit 516 generates the timing signal of the overlapped pixel of the respective signals A and B, and outputs the generated signals to the look-up table 521 and 522. Coefficients corresponding to the pixel positions are held in the look-up tables 521 and 522 and the coefficients are multiplied to the inputted signals A and B every pixel position. The look-up tables 521 and 522 have coefficients which gradually change between 0 and 1 in accordance with the pixel position in the overlapped pixels. In the area other than the overlapped pixel area, 0 or 1 is set as the coefficient.

The outputs from the look-up tables 521 and 522 are respectively supplied to an adder 524 and a delay device 523. The delay device 523 delays the inputted signal by the time corresponding to the reading operation difference and the time axes of the signals A and B match. After that, the signals are outputted to the adder 524. The adder 524 combines and outputs the signals A and B which are inputted.

Next, a description is given of the operation with the above structure according to the third embodiment with reference to FIGS. 15A to 15H. FIGS. 15A to 15H use a describing method similar to that shown in FIGS. 13A to 13H.

FIGS. 15A to 15H show the reading operation of all the pixels (for one horizontal period) of predetermined one row from the pixel portion 201. FIG. 15A shows the respective areas in the pixel portion 201. Reference symbols Z1, Z2, X1, X2, and Y have the same meaning as those shown in FIGS. 13A to 13H.

The reading method of the pixels are the same as those shown in FIGS. 13A to 13H. The subject is the same as that shown in FIGS. 13A to 13H. That is, referring to FIG. 15B, the image is picked up while the brightness smoothly changes from the left to the right in the horizontal direction.

The image pick-up device 22 divides the area into the divided-area-1 and divided-area-2. Further, in the case that the video signals in the divided-area-1 and divided-area-2 are outputted by the two-line reading operation, the respective output signals for one arbitrary horizontal period of the video signals Sig1 and Sig2 are as shown by reference symbols A and B shown in FIGS. 15C and 15D.

The A/D converter converts the respective signals A and B into digital signals. Then, the digital signals are transmitted to the calculation processing unit shown in FIG. 14. The timing generating circuit 516 generates timing signals ALU and BLU (refer to FIGS. 15F and 15E) indicating the pixel positions (addresses) in the pixel portion 201 corresponding to the signals A and B. The look-up tables 521 and 522 receive the timing signals BLU and ALU from the timing generating circuit 516. The look-up tables 521 and 522 multiply the coefficients held for the signals A and B every pixel position in accordance with the inputted timing signal.

That is, the look-up tables 521 and 522 multiply, to the signals A and B, specific multiplying coefficients $k_{1(x,y)}$ and $k_{2(x,y)}$ which are stored in the look-up tables. The signals A and B have been inputted on the timings designated by the timing generating circuit 516 at the specific pixel positions respectively. Reference symbols x and y denote the pixel positions (addresses) in the pixel portion 201.

The look-up tables 521 and 522 perform, to the inputs of the signals A and B, the multiplication as shown by characteristics A and B in FIGS. 15G and 15H. The characteristics A and B shown in FIGS. 15G and 15H indicate the execution of the multiplying operation by linearly changing the characteristics in accordance with the pixel positions in the horizontal direction only at the timings when the overlapped pixels are transmitted.

Signals A' and B' shown in FIGS. 15I and 15J indicate the levels of signals E which is generated by corresponding the signals A and B indicated on the matched time-axis, to the horizontal pixel positions in the space shown in FIG. 15B. In the case of the signal A', referring to FIG. 15G, the pixels in areas Z1 and X1, namely, the signals before one pixel at the horizontal position $x_0$ are multiplied by one as gain. The signal in the area Y, namely, the signal of the overlapped pixel at the horizontal position ranging $x_0$ to $x_m$ is multiplied by $(1-n/m)$ (where n denotes the horizontal pixel position based on the horizontal position $x_0$ as the reference) as gain. The signals in areas X2 and Z2, namely, the signal after the next pixel of the horizontal position $x_m$ is multiplied by 0 as gain.

Referring to FIG. 15H, in the case of the signal B', similarly, the pixels in the area Z1 and X1, namely, the signal before one pixel of the horizontal position x0 shown in FIG. 15G is multiplied by 0 as gain. The signal in the area Y, namely, the signal of the overlapped pixel at the horizontal position ranging $x_0$ to $x_m$ is multiplied by $(0+n/m)$ as gain. The signal in areas X2 and Z2, namely, the signal after the next pixel of the horizontal position $x_m$ is multiplied by 1 as gain.

The output of the look-up table 521 is supplied to the adder 524. The delay device 523 delays the signal B such that the output timing of the look-up table 522 matches the signal A. Then, the delayed signal is supplied to the adder 524. The adder 524 adds the inputted signals A and B and outputs one frame of the video signals.

In the video signals from the adder 524, the pixel position before one pixel of the horizontal position x0 is indicated by [A'×1+B'×0], the horizontal position $x_0$ to $x_m$ is indicated by [A'×(1−n/m)+B'×(0+n/m)], and the pixel position after the horizontal position $x_m$ is indicated by [A'×0+B'×1]. The output of the adder 524 is transmitted to the processing circuit at the latter stage. The overlappingly-read pixel is replaced as a final pixel signal level upon generating one frame image.

According to the third embodiment, in the area Y as the overlappingly-read area, the characteristic variation in output lines is suppressed. That is, at the boundary of the divided areas with the visually sharp characteristic variation, the smoothing processing is performed by a simple averaging calculation. Consequently, the video image is obtained with high quality.

After the processing according to the second embodiment, the third embodiment is applied, thereby obtaining the video image with further high quality.

Figure 16:
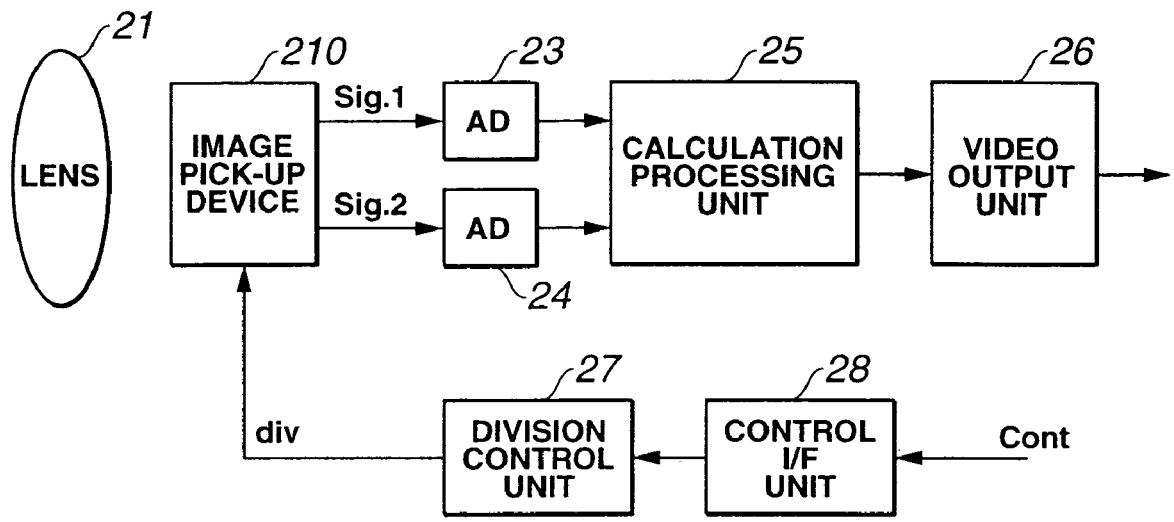
FIG. 16 is a block diagram showing an image pick-up device according to a fourth embodiment of the present invention.
Figure 17:
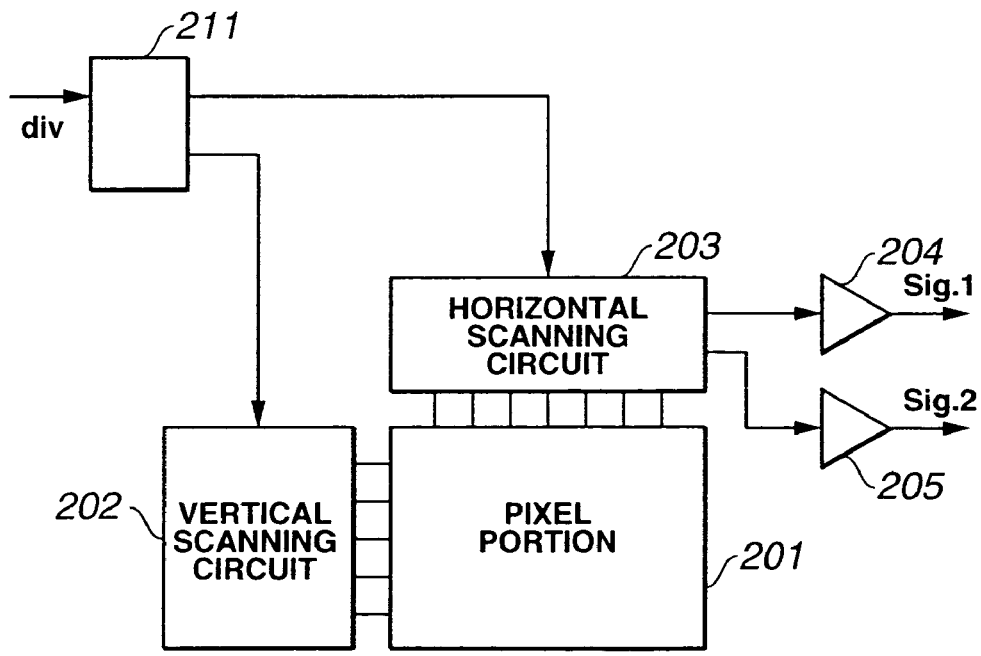
FIG. 17 is an explanatory diagram showing the specific structure of an image pick-up device 210 shown in FIG. 16 according to the fourth embodiment.

FIGS. 16 and 17 relate to the fourth embodiment. FIG. 16 is a block diagram showing an image pick-up device according to the fourth embodiment. FIG. 17 is an explanatory diagram showing the specific structure of an image pick-up device 210 shown in FIG. 16. Referring to FIGS. 16 and 17, the same components shown in FIGS. 4 and 5 are designated by the same reference numerals and a description thereof is omitted.

According to the fourth embodiment, the image pick-up device 210 is used in place of the image pick-up device 22, and further has a video output unit 26, a control interface unit 28, and a division control unit 27, different from the first embodiment described with reference to FIG. 4.

The video output unit 26 receives the video signal from the calculation processing unit 25, and outputs the video signal in a signal format suitable to an external device such as a display device. The image pick-up device 210 needs to be divided into a plurality of areas, depending on the number of pixels in the image pick-up device 210 and the condition of the number of pixels inputted to the display device. Further, the video signal of every divided area needs to be outputted from the video output unit 26.

For example, the final output of the video signal from the image pick-up device 210 is expressed as the video image through the connection to a predetermined display device or external device such as a recording device. However, upon transmitting fast, to the external device, the large amount of video signal data having numerous pixels, the video signals need to be outputted, in many cases, via a plurality of lines in parallel therewith under restrictions on the standard or data transfer speed of the external device.

In this case, the control interface unit 28 captures a division control command from the external device via a control input line Cont, and transmits the captured signals to the image pick-up device 210.

The division control command captured by the control interface unit 28 is supplied to the division control unit 27. The division control unit 27 outputs, based on the division control command, to the image pick-up device 210, a control signal for controlling the reading and scanning of the image pick-up device 210 in accordance with the output format which is requested by the external device of the video signal.

Referring to FIG. 17, the scanning control circuit 211 receives the control signal from the division control unit 27. The scanning control circuit 211 controls the vertical scanning circuit 202 and the horizontal scanning circuit 203, and divides the pixel portion 201 into the designated divided areas. The horizontal scanning circuit 203 outputs the video signals in every divided area from the output lines.

According to the fourth embodiment, with the above-mentioned structure, the dividing method of the pixel portion 201 is determined depending on the scanning of the vertical scanning circuit 202 and the horizontal scanning circuit 203. A command for the division control can externally be inputted from the image pick-up device 210 shown in FIG. 16. For example, the control input line Cont is connected to an output port of a general PC (personal computer), thereby obtaining, from the PC, information on the dividing specification of the image pick-up device 210. That is, the control interface unit 28 receives the information on the dividing specification inputted by the PC via the control input line Cont from an interface of the general PC, e.g., an IEEE1394 interface.

The control interface unit 28 supplies the captured division control command to the division control unit 27. The division control unit 27 transmits, in response to the request, to the image pick-up device 210, a control signal necessary for control of the image pick-up device 210, e.g., a control signal div as an address signal indicating the division pixel positions in the horizontal and vertical direction.

The scanning control circuit 211 receives the control signal div from the division control unit 27 and then controls the vertical scanning circuit 202 and the horizontal scanning circuit 203, thus changing the structure for the division and reading of the pixel portion 210. The above-mentioned determined pixel signals in the divided areas are outputted from the output lines by the horizontal scanning circuit 203. The video output unit 26 outputs the video signal from every divided area to the external device.

According to the fourth embodiment, the formats of the video signals simultaneously outputted in parallel therewith from the image pick-up device 210 are divided into a plurality of video signals in accordance with the specification required by the external device and the resultant signals are outputted. Therefore, the route from the input of the image pick-up signal to the output thereof does not need the conversion of video format. Further, a dedicated circuit such as a buffer memory is not necessary in the circuit of the solid-state image pick-up device. Thus, it is possible to scaledown the circuit with low consumption power and to reduce the processing time.

Figure 18:
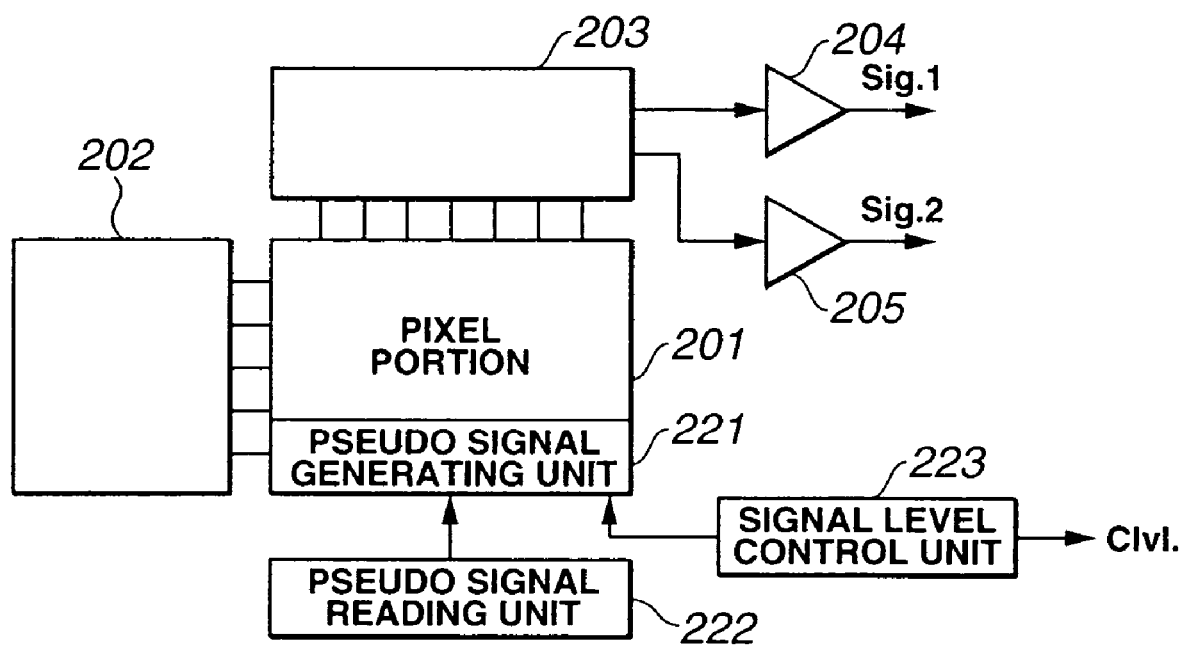
FIG. 18 is an explanatory diagram showing the structure of an image pick-up device according to a fifth embodiment of the present invention.
Figure 19:
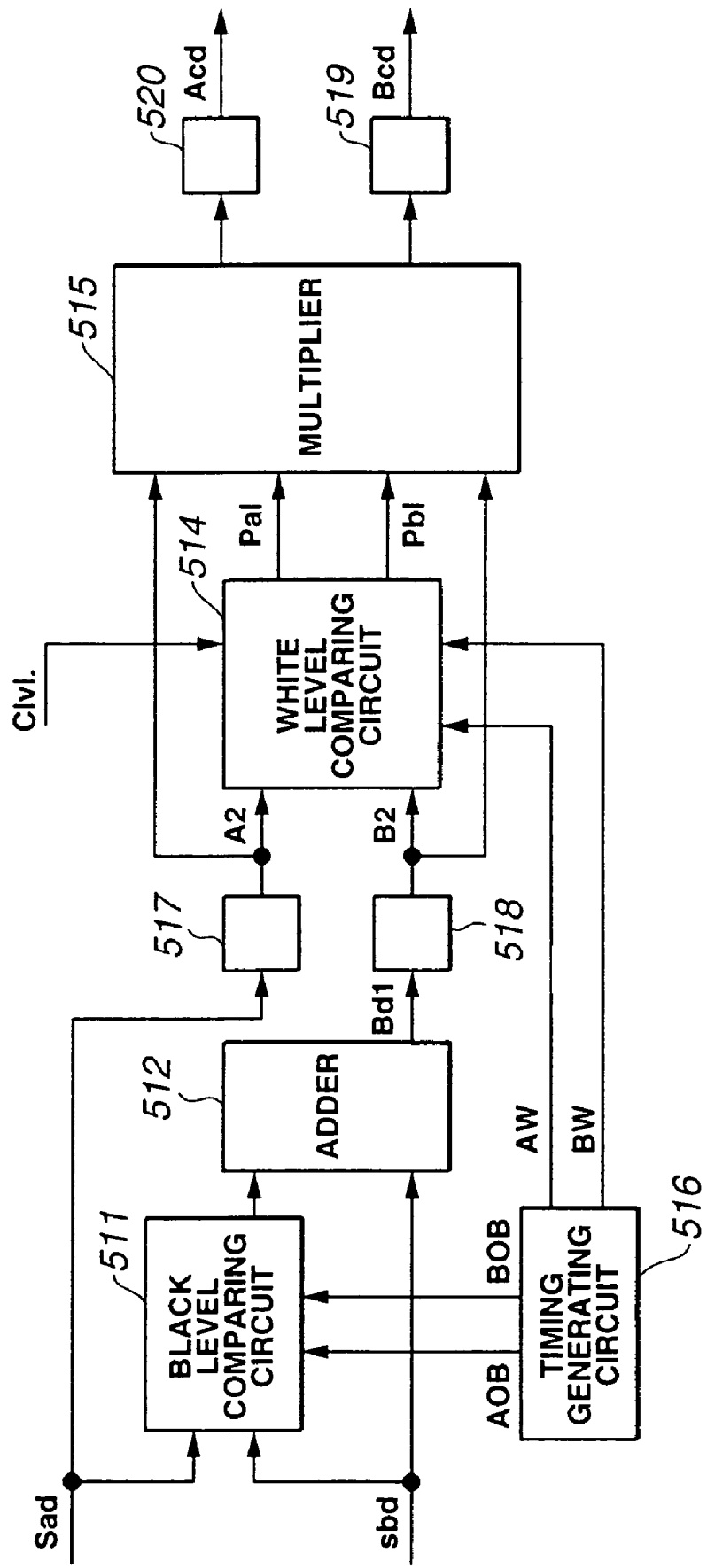
FIG. 19 is a block diagram showing a calculation processing unit according to the fifth embodiment.

FIGS. 18, 19, and 20A to 20F relate to the fifth embodiment of the present invention. FIG. 18 is an explanatory diagram showing an image pick-up device according to the fifth embodiment. FIG. 19 is a block diagram showing a calculation processing unit according to the fifth embodiment. FIGS. 20A to 20F are waveform diagrams showing signal waveforms of respective units. Referring to FIGS. 18 and 19, the same components shown in FIGS. 5 and 12 are designated by the same reference numerals and a description thereof is omitted.

According to the second embodiment described with reference to FIG. 12, the white level is corrected by using the overlapped pixel. However, according to the fifth embodiment, a known pseudo signal is outputted from the image pick-up device and the white level is corrected by using the pseudo signal.

The entire structure according to the fifth embodiment is similar to that shown in FIG. 4. However, the structures of the image pick-up device and the calculation processing unit are different from those shown in FIG. 4. FIG. 18 shows the image pick-up device according to the fifth embodiment. According to the fifth embodiment, the pixel area has a pseudo signal generating unit 221 which is formed to generate the pseudo signal, in addition to the pixel portion 201. The pseudo signal generating unit 221 is controlled by a signal level control unit 223 to generate the pseudo signal at the desired level. The pseudo signal reading unit 222 reads the pseudo signals from the pseudo signal generating unit 221 synchronously with the reading operation of the horizontal scanning circuit 203, multiplexes the read signals to the output from the horizontal scanning circuit 203, and outputs the multiplexed signals from the output lines. The signal level control unit 223 controls the level of the generated pseudo signal, and outputs a signal Clvl indicating the level of the generated pseudo signal.

According to the fifth embodiment, the division structure of the pixel portion may be arbitrary, and can be applied to any image pick-up device having a plurality of output circuits for individually outputting the video signals.

The video signals read from the pixel portion 201 are outputted to the output lines of two systems from the horizontal scanning circuit 203. As mentioned above, the video signal includes the pseudo signal. The characteristic variation in output lines can be corrected by matching the black level and the white level, similar to the case according to the second embodiment.

Referring to FIG. 19, the signal Clvl from the signal level control unit 223 is supplied to the white level comparing circuit 514. The video signals Sig1 and Sig2 based on the output of the image pick-up device 210 are supplied to the calculation processing unit shown in FIG. 19 as signals Sad and Sbd. First, the signals Sad and Sbd are inputted to the black level comparing circuit 511. The black level comparing circuit 511 compares the levels of the signals Sad and Sbd inputted at the input timings of the OB pixels corresponding to the signals Sad and Sbd, and the adder 512 matches the black level of the signal Sbd with the black level of the signal Sad based on the black level of the signal Sad as the reference, similar to the case according to the second embodiment.

The signals Sad and Sbd whose black levels are subtracted by the black level subtracting circuits 517 and 518 are supplied to the white level comparing circuit 514. The timing generating circuit 516 generates timing signals Aw and Bw indicating a multiplexing timing of the pseudo signal included in the signals Sad and Sbd, and outputs the generated signals to the white level comparing circuit 514.

The white level comparing circuit 514 compares the levels of the signals Sad and Sbd with the pseudo signals at the inserting timings of the pseudo signals, respectively, thus to obtain the ratios of the levels of the signal Sad and the pseudo signal and of the levels of the signal Sbd and the pseudo signal. The white level comparing circuit 514 recognizes the characteristics of the respective output lines based on the ratios of the levels of the signals Sad and Sbd obtained from the output lines and the level Clvl of the pseudo signals supplied from the signal level control unit 223. The white level comparing circuit 514 outputs, to the multiplier 515, a ratio Pal of the signal Sad and the level Clvl and a ratio Pbl of the signal Sbd and the level Clvl.

The multiplier 515 corrects the white levels of the signals Sad and Sbd by multiplying the ratios Pal and Pbl from the white level comparing circuit 514 to the signals Sad and Sbd whose black levels are removed. Thus, the characteristics of the white levels of the signals Sad and Sbd can be matched. The signals Sad and Sbd whose white levels from the multiplier 515 are corrected are supplied to the black level reproducing circuits 520 and 519. The black level reproducing circuits 520 and 519 reproduce the black levels of the inputted signals Sad and Sbd and output signals Acd and Bcd.

Next, a description is given of the operation according to the fifth embodiment with reference to FIGS. 20A to 20F. The axis of abscissa in FIGS. 20A to 20F indicates the signal level and the axis of ordinate indicates the time.

FIGS. 20A to 20F show the reading operation of one predetermined column (one vertical period) from the pixel portion 201 and the pseudo signal generating unit 221. FIG. 20A shows the areas of the pixel portion 201 and pseudo signal generating unit 221. Reference symbols X1 and X2 denote the divided areas and reference symbol D denotes the area on which the pseudo signal generating unit 221 is formed. The reading operation is performed in the vertical direction respectively for one vertical period in the divided area X1, the area D of the column thereof, the divided area X2, and the area D of the column thereof. In the example shown in FIG. 18, the pseudo signal generating unit 221 is continuously arranged as the area D in the pixel portion 201 like the pixel in the horizontal direction. However, the arrangement of the pseudo signal generating unit 221 is not limited and it may be arranged external to the pixel portion 201.

The pixels in the respective divided areas X1 and X2 and the pseudo signal generating unit 221 are sequentially scanned from the lines on the upper side to the lines on the lower side by the vertical scanning circuit 202 and from the left to the right by the horizontal scanning circuit 203. Referring to FIG. 20B, an image of the subject is picked up with the brightness which smoothly changes from the upper side to the lower side in the vertical direction.

The pseudo signal generating unit 221 always generates the pseudo signal level as a constant level (V1) which does not depend on the amount of incident light via the lens 21. The level of pseudo signal is adjusted to a predetermined level by the signal level control unit 223. The pseudo signal reading unit 222 reads the pseudo signal generated by the pseudo signal generating unit 221. The signal level control unit 223 transmits the data Clvl for specifying the level of the generated pseudo signal.

Referring to FIG. 20A, the pseudo signals are read like the pixels which are continuously arranged in the horizontal direction in accordance with completely the same sequence for reading the pixels in the pixel portion 201 by the vertical scanning circuit 202 and the horizontal scanning circuit 203. The signals Sad and Sbd from the divided areas X1 and X2 are to have the signal level based on the matching characteristic every arbitrary vertical line in the original area. However, the signals Sad and Sbd have electric characteristics varying depending on the reading line. Thus, the signals are outputted from the image pick-up device 210 at the signal level with different characteristics.

The signals Sad and Sbd are supplied to the black level comparing circuit 511 in the calculation processing unit shown in FIG. 19, and the black levels are compared. With respect to the video signals Sad and Sbd outputted from the image pick-up device 210, similar to the second embodiment, the black level of the signal Sbd in the divided area X2 is corrected based on the signal Sad in the divided area X1 as the reference by referring to the signal level in the OB area (not shown). In the black level subtracting circuit 518, the black level of a signal Bdl (refer to FIG. 20D), whose black level is corrected by the adder 512, is subtracted and the resultant signal is supplied to the white level comparing circuit 514. Similarly, in the black level subtracting circuit 517, the black level of the signal Sad (refer to FIG. 20C) is subtracted and the resultant signal is supplied to the white level comparing circuit 514.

The white level comparing circuit 514 receives, from the timing generating circuit 516, timing signals Aw and Bw (refer to FIGS. 20E and 20F) for instructing the timings for inputting the levels of the pseudo signals included in the signals transmitted from the respective divided areas. Further, the white level comparing circuit 514 recognizes the position of the pseudo signal in accordance with the timing signal and compares the level of the pseudo signal included in the signal inputted to the white level comparing circuit 514 with a level Vd which is supplied by the data Clvl.

Consequently, ratios Pal [=Vd/(Val−Vbb)] and Pbl [=Vd/(Vbl−Vbb)] are calculated based on the original pseudo signal level Vd and the signal levels obtained by subtracting the black level Vbb from the respective pseudo signal levels Val and Vbl included in the signals Sad and Sbd. Then, the ratios Pal and Pbl are outputted to the multiplier 515. The multiplier 515 receives signals A2 and B2 which are obtained by subtracting the black levels. The ratios Pal and Pbl are multiplied to the signals A2 and B2, thereby obtaining the signals having matching the pseudo signal level (e.g., white level). A multiplying result of the multiplier 515 is supplied to the black level reproducing circuits 520 and 519 respectively, then, the black level is reproduced, and video signals Acd and Bcd are obtained.

According to the fifth embodiment, the image pick-up device can individually transmit every divided area the output pixel at the specific level, which is fixed and known, to the latter stage. With this image pick-up device, the pseudo signal level which is originally set is compared with the pseudo signal level which is actually read every divided area, thus finding the level difference. The signals are corrected based on the obtained difference. Therefore, it is possible to correct in real-time the characteristic variation in reading circuits, namely, offset variation due to the correction of black level and the gain variation due to the white variation.

Further, in an image pick-up device which does not necessarily require the real-time correction, such as a camera for still image, the correcting operation according to the fifth embodiment may be performed by reading only the pseudo signal level in accordance with the trigger input from an external switch.

The correction processing according to the fifth embodiment is performed with various white levels obtained by changing the pseudo signal level at a predetermined interval, thereby correcting the linearity variation.

Figure 21A:
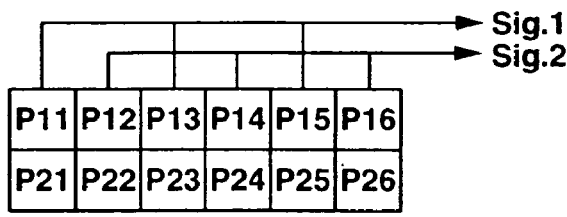
FIGS. 21A and 21B are explanatory diagrams of one structure of an image pick-up device according to a sixth embodiment of the present invention.
Figure 21B:
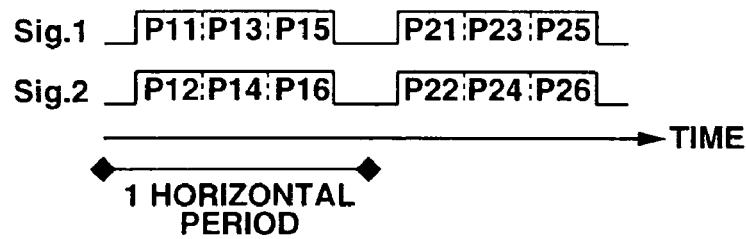
Figure 23:
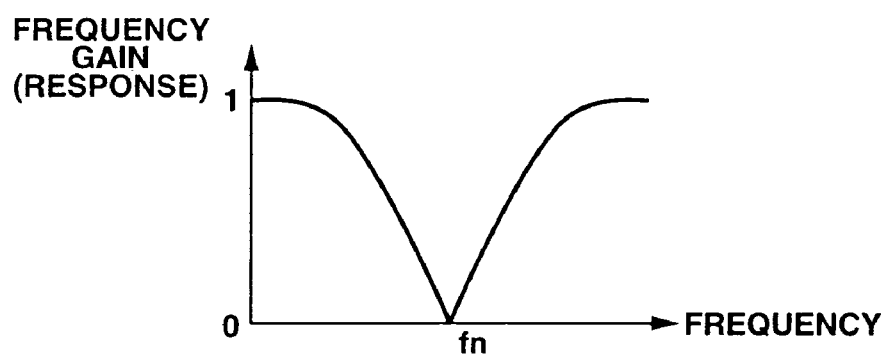
FIG. 23 is a graph for explaining filter processing in a calculation processing unit according to the sixth embodiment.
Figure 22:
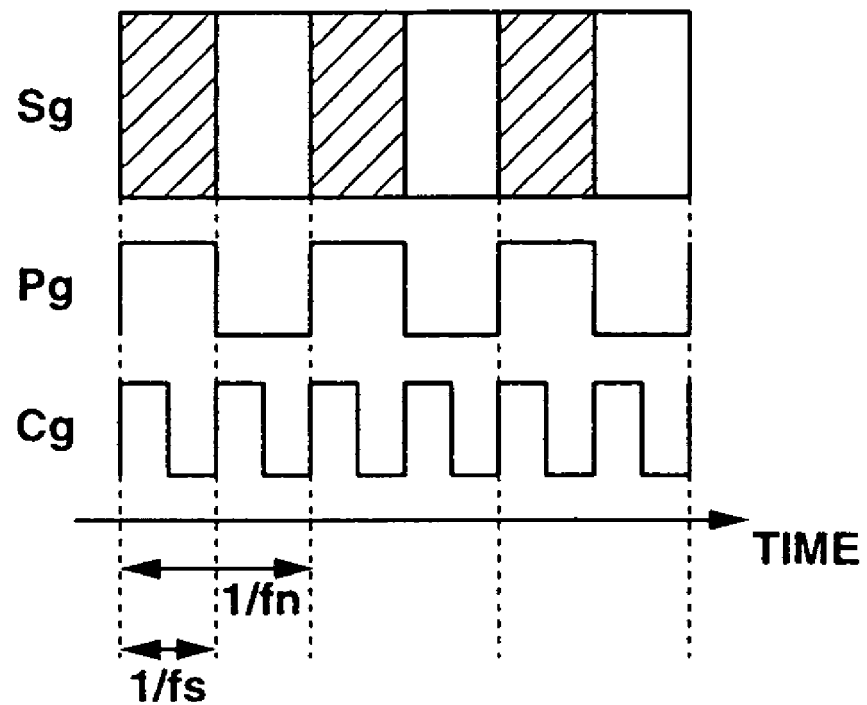
FIG. 22 is an explanatory diagram of noise patterns based on the variation in output lines in an image pick-up device according to the sixth embodiment.

FIGS. 21A and 21B to 23 relate to the sixth embodiment of the present invention. FIGS. 21A and 21B are explanatory diagrams for the structure of an image pick-up device according to the sixth embodiment. FIG. 22 is an explanatory diagram of noise patterns based on the variation in output lines in the image pick-up device according to the sixth embodiment. FIG. 23 is a graph for explaining the filter processing in a calculation processing unit.

According to the sixth embodiment, the entire structure according to the sixth embodiment is the same as that shown in FIG. 4. However, the structure of the image pick-up device and the processing of the calculation processing unit are different from those shown in FIG. 4. FIG. 21A shows a relationship between the pixels and the respective output lines of the image pick-up device. FIG. 21B shows the output signals from the output lines. Further, FIGS. 21A and 21B show a pixel portion containing (2 rows×6 columns).

In the image pick-up device according to the sixth embodiment, the pixel signals of the adjacent pixels in the horizontal direction are read via the different output lines. Among a pixel $P_{xy}$ (x=1 and 2 and y=1 to 6), pixel signals Px1, Px3, and Px5 read from pixels $P_{x1}$, $P_{x3}$, and $P_{x5}$ in the odd column are outputted as the signal Sig1 via one output line. The pixel signals $P_{x2}$, $P_{x4}$, and $P_{x6}$ read from pixels $P_{x2}$, $P_{x4}$, and $P_{x6}$ in the even column are outputted as the signal Sig2 via the other output line. The respective signals Sig1 and Sig2 from the output lines are as shown in FIG. 21B. Referring to FIG. 21B, schematically, the axis of abscissas indicates the time and the axis of ordinate indicates the signal level.

The signals Sig1 and Sig2 have the varied characteristics depending on the output lines. An image obtained by combining the signals Sig1 and Sig2 is indicated by a signal Sg shown in FIG. 22. That is, the characteristic variation in the image obtained by combining the signals Sig1 and Sig2 appears like longitudinal stripes on the image. When the characteristic variation in the combined image is indicated on the time axis as a frequency component, the pattern (noise component) is indicated as a pattern Pg shown in FIG. 22. That is, the characteristic variation in output lines is superimposed upon the original image as the noise component of a frequency fn [Hz]. Reference symbol Cg shown in FIG. 22 denotes a reading clock (sampling clock) of the pixel. A frequency fs of the clock (sampling clock) Cg is twice the frequency fn of the noise component based on the characteristic variation.

According to the sixth embodiment, the signals Sig1 and Sig2 are subjected to the filter processing in the calculation processing unit. According to the sixth embodiment, the calculation processing unit performs the filter processing shown in FIG. 23. FIG. 23 shows the filter processing of the calculation processing according to the sixth embodiment, with the abscissa indicating the frequency and the axis of ordinate indicating the frequency gain. In other words, in the calculation processing according to the sixth embodiment, ideally, the filter processing is performed by the gain 0 for the noise component of the frequency fn. By the filter processing using the calculation processing unit, the noise component of the frequency fn is sufficiently suppressed, thus obtaining the video signal from which the noise component is removed.

Originally, under well-known Nyquist theorem, it is impossible to accurately reproduce the frequency component more than the frequency fn of the image based on the pixel sampled by the frequency fs (=2×fn). With Nyquist theorem, the calculation processing unit sufficiently reduces the frequency response of the noise frequency fn based on the characteristic variation. In the case of reducing the frequency response of the frequency fn with the characteristic shown in FIG. 23, the longitudinal stripes as the noise component are suppressed without the extreme deterioration in image quality.

According to the sixth embodiment, the calculation processing unit performs the filter processing to sufficiently reduce the response of the frequency which is twice of the sampling frequency. The image deterioration due to the characteristic variation in output lines is prevented by only the circuit at the latter stage having the simple structure which does not require the specific pixel signal.

According to the sixth embodiment, as one example shown in FIGS. 21A and 21B, the signals are outputted via a plurality of output lines which are different for every two adjacent pixels in the horizontal direction. When the output lines for outputting the pixel signal are different for every two adjacent pixels, the filter processing shown in FIG. 23 enables the correction of image deterioration due to the variation in output lines. Therefore, this example can be applied to the case in which the output lines for outputting the pixel signal are different for every two adjacent pixels in the vertical direction. Further, this example can be applied to the case in which the output lines for outputting the pixel signal are different every two adjacent pixels in the horizontal direction and vertical direction.

Figure 24A:
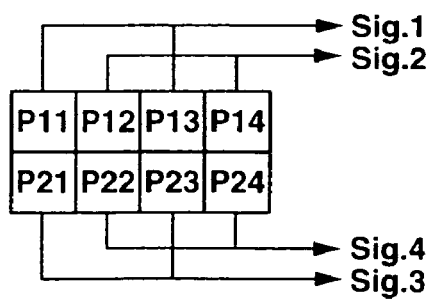
FIGS. 24A and 24B are explanatory diagrams of another structure of the image pick-up device according to a modification of the sixth embodiment.
Figure 24B:
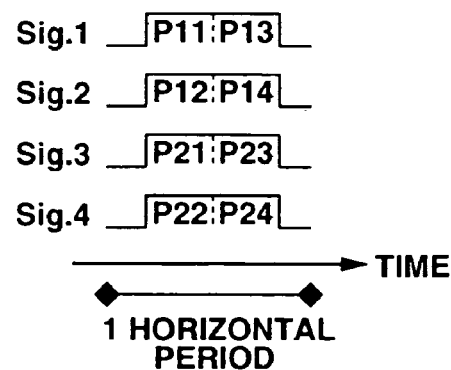
Figure 25:
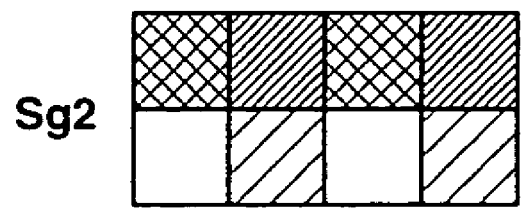
FIG. 25 is an explanatory diagram of noise patterns based on the variation in output lines of the image pick-up device according to the modification of the sixth embodiment.

FIGS. 24A, 24B, and 25 explain the example in this case. FIGS. 24A and 24B are explanatory diagrams for the structure of the image pick-up device. FIG. 24A shows a relationship between the pixels and the output line in the image pick-up device. FIG. 24B shows the output signals from the output lines. Further, FIGS. 24A and 24B show the pixel portion containing (2 rows×4 columns). FIG. 25 is an explanatory diagram of the noise patterns based on the variation in output lines in the image pick-up device.

Referring to FIG. 24A, the image pick-up device outputs the adjacent pixel signals in the horizontal and vertical directions via the different output lines. Among the pixel $P_{xy}$ (x=1 and 2, and Y=1 to 4), pixel signals $P_{11}$ and $P_{13}$ read from pixels $P_{11}$ and $P_{13}$ in the odd column and odd row are outputted as the signal Sig1 via the common output line. The pixel signals $P_{12}$ and $P_{14}$ read from pixels $P_{12}$ and $P_{14}$ in the odd row and even column are outputted as the signal Sig2 via the common output line. The pixel signals $P_{21}$ and $P_{23}$ read from pixels $P_{21}$ and $P_{23}$ in the even row and odd column are outputted as the signal Sig3 via the common output line. The pixel signals $P_{22}$ and $P_{24}$ read from pixels $P_{22}$ and $P_{24}$ in the even column and even row are outputted as the signal Sig4 via the common output line. The signals Sig1 to Sig4 from the common output lines are shown in FIG. 21B. Referring to FIG. 21B, schematically, the abscissa indicates the time and the axis of ordinate indicates the signal level.

The signals Sig1 to Sig4 have the varied characteristics depending on the output lines. An image obtained by combining the signals Sig1 to Sig4 is indicated by a signal Sg2 shown in FIG. 25. That is, the characteristic variation in the image obtained by combining the signals Sig1 to Sig4 appears like longitudinal stripes on the image. That is, the noise component due to the variation in respective output lines has the frequency component which is twice of the sampling frequency. Therefore, in this case, the video signals of the combined image are subjected to filter processing with the characteristic shown in FIG. 23. Thus, it is possible to sufficiently suppress the noise component due to the variation depending on the output lines.

As mentioned above, when the output lines for outputting the pixel signal are different every two adjacent pixels, it is possible to effectively suppress the deterioration in image quality due to the variation in output lines by executing the filter processing shown in FIG. 23.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image pick-up apparatus comprising an image pick-up device and a filter circuit, the image pick-up device comprising:

a pixel portion for converting a subject image into an electric signal;

a scanning circuit for dividing the pixel portion into a plurality of scanning areas, so that a boundary between adjacent areas is non-linear, each portion of said boundary being a length measured in units of a pixel; and a plurality of output circuits, each circuit outputting a video signal from an associated one of said areas, and said filter circuit performing filter processing of the video signals outputted from the plurality of output circuits to modify pixels near the boundary of the areas;

said scanning circuit being configured to divide the scanning area so that a boundary has a plurality of horizontal and vertical boundary portions, each boundary portion having a length of at least one pixel unit; and said filter circuit being configured to calculate a filter coefficient for each pixel in the scanning areas and comprising:

a unit configured to store pixel values of all pixels in said pixel portion in a memory;

a unit configured to select a sub-portion of all pixels in the memory, the sub-portion being a pixel array having M rows and N columns which includes a target pixel whose filter coefficient is being determined; and sum signal values of pixels in the M rows by N columns array to obtain a filter coefficient representing an influence on the target pixel of pixels in said M by N array which occupies adjacent portions of the areas divided by said boundary.

2. The apparatus of claim 1, wherein M and N are odd numbers greater than 1.

3. The apparatus of claim 1, wherein the target pixel lies in a center column of the M rows by N columns array.

4. The apparatus of claim 3, wherein the target pixel lies in a center row of the M rows by N columns array.

5. The apparatus of claim 1, wherein the filter circuit further comprises:

modifying a signal output of each pixel according to its associated filter coefficient to smooth image quality of an image and thereby improve image quality along said boundary.

* * * * *